(12) United States Patent
Mizuochi et al.

(10) Patent No.: US 6,292,603 B1
(45) Date of Patent: Sep. 18, 2001

(54) DISPERSION COMPENSATION DEVICE

(75) Inventors: Takashi Mizuochi; Tadayoshi Kitayama; Hideaki Tanaka; Koji Goto, all of Tokyo (JP)

(73) Assignees: Kokusai Denshin Denwa Co., Ltd.; Mitsubishi Denki Kabushiki Kaisha, both of Tokyo (JP)

( * ) Notice: Subject to any disclaimer, the term of this patent is extended or adjusted under 35 U.S.C. 154(b) by 0 days.

(21) Appl. No.: 09/207,419

(22) Filed: Dec. 8, 1998

(30) Foreign Application Priority Data

May 29, 1998 (JP) .................................................. 10-150332

(51) Int. Cl.[7] ..................................................... G02B 6/28
(52) U.S. Cl. ........................... 385/24; 359/173; 359/188; 359/193; 359/195
(58) Field of Search ........................ 385/24, 27; 356/477; 359/152, 153, 154, 161, 173, 180, 188, 189, 193, 195

(56) References Cited

U.S. PATENT DOCUMENTS

| | | | |
|---|---|---|---|
| 5,048,909 | * | 9/1991 | Henry et al. ............................ 385/27 |
| 5,093,876 | | 3/1992 | Henry et al. . |
| 5,978,114 | * | 11/1999 | Clark et al. ............................ 359/115 |
| 5,982,518 | * | 11/1999 | Mizrahi ................................ 359/130 |
| 6,122,418 | * | 9/2000 | Ellis ....................................... 385/27 |
| 6,188,823 | * | 2/2001 | Ma ........................................ 385/123 |

FOREIGN PATENT DOCUMENTS

| | | |
|---|---|---|
| 0732819 A2 | 9/1996 | (EP) . |
| A 61-38908 | 2/1986 | (JP) . |
| A 7-327012 | 12/1995 | (JP) . |
| A 9-326759 | 12/1997 | (JP) . |

OTHER PUBLICATIONS

Govind P. Agrawal, *Nonlinear Fiber Optics*, Academic Press (1989).

Hayee et al., *IEEE Photonics Technology Letters*, vol. 9, No. 9, p. 1271 (Sep. 1997).

Johnson et al., *Electronic Letters*, "New design concept for narrowband wavelength–selective Optical tap and combiner", vol. 23, No. 13, pp. 668–669 (Jun. 1987).

* cited by examiner

*Primary Examiner*—Frank G. Font
*Assistant Examiner*—Phil Natividad

(57) ABSTRACT

A dispersion compensation device comprises a chirped grating, and a first optical unit for guiding at least a lightwave signal with a wavelength of $\lambda_{-i}$ that needs a positive dispersion compensation and is applied thereto to one end portion of the chirped grating whose grating pitch is shorter, and for furnishing light reflected by the chirped grating to outside the device. The device further comprises a second optical unit for guiding at least a lightwave signal with a wavelength of $\lambda_i$ that needs a negative dispersion compensation and is applied thereto to another end portion of the chirped grating whose grating pitch is longer, and for furnishing light reflected by the chirped grating to outside the device. Both the first and second optical units can be either optical circulators or optical couplers.

21 Claims, 12 Drawing Sheets

DISPERSION COMPENSATION DEVICE

BACKGROUND OF THE INVENTION

1. Field of the Invention

The present invention relates to a dispersion compensation device capable of compensating chromatic dispersion caused by optical fibers in a multiple-wavelength light transmission system so as to reduce waveform distortions due to the chromatic dispersion.

2. Description of the Prior Art

Recent years have seen the wide use of wavelength multiplexing technology as a measure to increase the amount of transmission through optical fibers. In the wavelength multiplexing technology, N light sources each of which can emit light with a different wavelength are disposed and each light is modulated with a data signal having a bit rate B, so that the amount of transmission is increased up to N*B. Recently, by using the wavelength multiplexing technology and light amplification technology, a system capable of transmitting lightwave signals with an amount of transmission of more than 100 Gbits at distances of up to 10,000 km is proceeding toward practical utilization.

Conventionally, in a 1.55 μm-wavelength-range optical fiber transmission system, in order to reduce the occurrence of waveform distortions due to the chromatic dispersion caused by optical fibers to a minimum, dispersion shifted fibers or DSFs, which are designed so that the chromatic dispersion is zero at a wavelength of 1.55 μm, have been used. If such prior art dispersion shifted fibers are used for a multiple-wavelength light transmission system, as previously mentioned, with a large amount of transmission, the system can be brought into a state in which the propagation constants for wavelengths which are next to each other are of almost equal, that is, phase matching is established, so that a unnecessary signal is generated due to the four-wave mixing. Although a description of the four-wave mixing will be omitted hereafter because an explanation for the four-wave mixing is given in detail by for example Govind P. Agrawal, "Nonlinear Fiber Optics", Academic Press, 1989, it should be noted that the four-wave mixing causes serious degradation of the transmission characteristic.

In order to prevent the four-wave mixing, nonzero dispersion shifted fibers whose zero dispersion wavelength is forced to deviate from a lightwave signal wavelength range are now going to use in multiple-wavelength light transmission systems. For example, in a case where multiple-wavelength light with a wavelength range of 1,550 nm to 1,560 nm is transmitted via a nonzero dispersion shifted fiber whose zero dispersion wavelength is 1,580 nm and whose dispersion slope is 0.1 ps/nm²/km, a light component with a wavelength of 1,550 nm is transmitted while it undergoes −3 ps/nm/km of dispersion and a light component with a wavelength of 1,560 nm is transmitted while it undergoes −2 ps/nm/km of dispersion. Therefore, in this case, phase matching is not established adequately and hence this makes it difficult for the four-wave mixing to occur.

When such multiple-wavelength light is transmitted over great distances by way of a nonzero dispersion shifter fiber, each light component undergoes a cumulative, negative amount of dispersion. To reduce the average of the amounts of dispersion which all light components undergo to zero, so-called "dispersion management" is carried out. To do dispersion management, some 1.3 μm zero-dispersion fibers of an appropriate length, each of which provides a certain amount of dispersion of +17 ps/nm/km for light with a wavelength of 1.55 μm, are inserted at some midpoints in the transmission path. However, depending on the wavelength, a light component has an amount of residual dispersion, which has not been canceled, due to the gradient of the dispersion characteristic of nonzero dispersion shifted fibers, i.e. dispersion slope. For example, in a nonzero dispersion shifted fiber 10,000 km long in which dispersion management is carried out such that the dispersion for light with a wavelength of 1,555 nm is zero, a light component with a wavelength of 1,550 nm has a certain amount of residual dispersion of (1,555−1,550)*0.1*10,000 km = −5,000 ps/nm and a light component with, a wavelength of 1,560 nm has a certain amount of residual dispersion of (1,560−1,555) *0.1*10,000 km=+5000 ps/nm.

A sending terminal station performs a dispersion compensation operation on each light component with a certain wavelength in multiple-wavelength light including light components each having such residual dispersion, using a dispersion compensation fiber. Dispersion compensation that is carried out at a sending terminal station is called pre dispersion compensation. On the other hand, dispersion compensation that is carried out at a receiving terminal station is called post dispersion compensation. Sharing a needed amount of dispersion compensation half and half between the sending terminal station and the receiving terminal station is effective in compensating the residual dispersion in each light component, as disclosed by M. I. Hayee et al., "Pre-and Post compensation of dispersion and nonlinearities in 10-Gb/s WDM systems", IEEE Photonics Technology Letters, Vol. 9, No. 9, pp. 1271, 1997.

Referring now to FIG. 9, there is illustrated a block diagram showing the structure of an example of a wavelength multiplexing sending terminal station including eight optical sources and a plurality of prior art dispersion compensation devices each for performing pre dispersion compensation. In the figure, reference numerals 100a to 100h denote optical sources (or optical senders), i.e. OSs for sending out lightwave signals with wavelengths of $\lambda_{-4}$, $\lambda_{-3}$, $\lambda_{-2}$, $\lambda_{-1}$, $\lambda_{+1}$, $\lambda_{+2}$, $\lambda_{+3}$, $\lambda_{+4}$, respectively, 102a to 102g denote dispersion compensation fibers each for providing a positive amount of dispersion for light of a wavelength which lies in a 1.55 μm wavelength range, 103a to 103g denote dispersion compensation fibers each for providing a negative amount of dispersion for light of a wavelength which lies in a 1.55 μm wavelength range, 104a to 104i denote light amplifiers, and 105 denotes an optical multiplexer. Preferably, an array type waveguide grating or AWG is used as the optical multiplexer 105. In addition, reference numeral 106 denotes a transmission fiber in which dispersion management is carried out. A single mode fiber or SMF whose zero dispersion wavelength is typically 1.3 μm is used as each of the plurality of dispersion compensation fibers 102a to 102g for providing a positive amount of dispersion. The amount of dispersion per a loss of 1 dB provided by one single mode fiber can be in the range of +80 ps/nm to +100 ps/nm. On the other hand, each of the plurality of dispersion compensation fibers 103a to 103g can produce a certain negative amount of dispersion of −240 ps/nm per a loss of 1 dB. In this specification, a dispersion compensation fiber for providing a negative amount of dispersion is simply referred to as a DCF. The reason why when comparing the path for a lightwave signal with a wavelength of $\lambda_{+4}$ with the path for a lightwave signal with a wavelength of $\lambda_{-4}$ in the system as shown in FIG. 9, for example, the number of light amplifiers disposed on the path for the lightwave signal with a wavelength of $\lambda_{+4}$ is less than the number of light amplifiers disposed on the path for the lightwave signal with a wavelength of $\lambda_{-4}$ is that the amount of dispersion per a loss of 1 dB caused by one DCF is greater than that caused by one SMF, that is, the dispersion efficiency of one DCF is greater than that of one SMF.

A description will be made as to the operation of the sending terminal station. The sending terminal station can provide a certain amount of dispersion for each lightwave signal of a certain wavelength using the plurality of dispersion compensation fibers 102a to 102g and the plurality of dispersion compensation fibers 103a to 103g, in consideration of the residual dispersion to be caused by the transmission fiber 106. Referring next to FIG. 10, there is illustrated a graph showing an example of the residual dispersion caused by the transmission fiber 106. In the figure, $\lambda_{-i}$ (i=1 to 4) denotes a wavelength which is shorter than the zero dispersion wavelength of the transmission fiber 106, and $\lambda_{+i}$ (i=1 to 4) denotes a wavelength which is longer than the zero dispersion wavelength of the transmission fiber 106. As shown in FIG. 10, since acumulative amount of dispersion which the lightwave signal with a wavelength of $\lambda_{-i}$ undergoes in the transmission fiber 106 is negative, a dispersion compensation using at least a fiber for providing a positive amount of dispersion is needed. On the other hand, since a cumulative amount of dispersion which the lightwave signal with a wavelength of $\lambda_{+i}$ undergoes in the transmission fiber 106 is positive, a dispersion compensation using at least a fiber for providing a negative amount of dispersion is needed. When the zero dispersion wavelength of the transmission fiber sits right at the center of the wavelength range of the multiple-wavelength light passing through the transmission fiber 106, as shown in FIG. 10, both the lightwave signal with a wavelength of $\lambda_{-i}$ and the lightwave signal with a wavelength of $\lambda_{+i}$ undergo cumulative dispersion of the same absolute,amount but of opposite sign in the transmission fiber 106, respectively.

When sharing a needed amount of dispersion compensation half and half between the sending terminal station and the receiving terminal station, the lightwave signal with a wavelength of $\lambda_{-4}$ needs one-half of +7,000 ps/nm, i.e. +3,500 ps/nm of dispersion compensation, as can be seen from FIG. 10. Similarly, the lightwave signal with a wavelength of $\lambda_{-3}$ needs +2,500 ps/nm of dispersion compensation, the lightwave signal with a wavelength of $\lambda_{-2}$ needs +1,500 ps/nm of dispersion compensation, and the lightwave signal with a wavelength of $\lambda_{-1}$ needs +500 ps/nm of dispersion compensation. It is clear from the summation of the amounts of dispersion compensation needed for all the lightwave signals that the plurality of positive dispersion compensation fibers alone need to perform +8,000 ps/nm of dispersion compensation. To do so, SMFs having a total length of more than about 470 km are needed and a large amount of space for mounting those fibers is therefore needed. On the other hand, the plurality of negative dispersion compensation fibers have to have a total length corresponding to −8,000 ps/nm of dispersion compensation. The needed total length corresponds to ten 16 cm-diameter reels.

Recently, a dispersion compensation device using a chirped grating fiber, which will be hereafter referred to as a dispersion compensation grating or DCG, has been developed specifically to solve the above problem of increasing the space for mounting a plurality of positive and negative dispersion compensation fibers. Referring next to FIG. 11, there is illustrated a block diagram showing the structure of such a prior art dispersion compensation device. In the figure, reference numeral 120 denotes a DCG, 121 denotes an input terminal, 122 denotes an output terminal, 123 denotes an optical circulator, 124 denotes a chirped grating fiber, and 125 denotes a reflectionless termination. A lightwave signal, which has been input to the DCG 120 by way of the input terminal 121, is furnished to the chirped grating fiber 124 by way of an intermediate terminal of the optical circulator 123. The chirped grating fiber 124 is a wavelength selectable reflector in which the grating pitch of the chirped grating fiber gradually increases along its length extending from one end portion connected to the optical circulator 123 to another end portion that is farther from the optical circulator 123, and has the reflection characteristic as shown in FIG. 12(a). As the wavelength of a light component included in the lightwave signal input via the input terminal decreases, it is reflected off a point in the chirped grating fiber 124 where is closer to the optical circulator 123 and is then furnished by way of the output terminal 122. On the contrary, as the wavelength of a light component included in the lightwave signal input via the input terminal increases, it is reflected off a point in the chirped grating fiber 124 where is farther from the optical circulator 123, and is then furnished by way of the output terminal 122. Thus, the chirped grating fiber 124 has the group delay characteristic as shown in FIG. 12(b). In other words, the chirped grating fiber 124 can serve as an optical circuit for providing a positive amount of dispersion of +1,000 ps/nm. Alternatively, the DCG 120 can be so constructed as to provide a negative amount of dispersion by making the grating pitch of the chirped grating fiber gradually decrease along its length extending from one end portion connected to the optical circulator 123 to another end portion that is farther from the optical circulator 123.

Referring next to FIG. 13, there is illustrated a block diagram showing the structure of an example of a wavelength multiplexing sending terminal station including eight optical sources and using a plurality of DCGs as shown in FIG. 11. In the figure, reference numerals 140a to 140d denote DCGs each for providing a positive amount of dispersion, and 141a to 141d denote DCGs each for providing a negative amount of dispersion. Thus, by using the plurality of DCGs as shown in FIG. 11 instead of the plurality of dispersion compensation fibers as shown in FIG. 9, the space needed for amounting the sending terminal station can be reduced largely.

However, a problem with the prior art dispersion compensation device or DCG, which is so constructed as mentioned above, is that a ripple in the amplitude of light and a variation in the group delay characteristic can cause a transmission penalty, a difficult manufacturing technique is needed to prevent a ripple in the amplitude of light and a variation in the group delay characteristic, and this results in increasing the manufacturing cost. Accordingly, the use of one dispersion compensation device or DCG for each wavelength in a transmission terminal station causes an increase in the cost of building the system.

SUMMARY OF THE INVENTION

The present invention is made to overcome the above problem. It is therefore an object of the present invention to provide a dispersion compensation device capable of doubling the efficiency of dispersion compensation as compared with the prior art DCG, and hence decreasing the cost of building a terminal station.

In accordance with the present invention, there is provided a dispersion compensation device comprising a chirped grating, a first optical unit for guiding at least a lightwave signal with a wavelength of $\lambda_i$ that needs a positive dispersion compensation and is applied thereto to one end portion of the chirped grating whose grating pitch is shorter, and for furnishing light reflected by the chirped grating, and a second optical unit for guiding at least a lightwave signal with a wavelength of $\lambda_j$ that needs a negative dispersion compensation and is applied thereto to another end portion of the chirped grating whose grating pitch is longer, and for furnishing light reflected by the chirped grating.

In accordance with a preferred embodiment of the present invention, the first optical unit can be a first optical circulator having an intermediate terminal connected to the end portion of the chirped grating whose grating pitch is shorter. In addition, the second optical unit can be a second optical circulator having an intermediate terminal connected to the other end portion of the chirped grating whose grating pitch is longer.

In accordance with another preferred embodiment of the present invention, the first optical unit can be a first optical coupler having a terminal connected to the end portion of the chirped grating whose grating pitch is shorter. In addition, the second optical unit can be a second optical coupler having a terminal connected to the other end portion of the chirped grating whose grating pitch is longer.

In accordance with another preferred embodiment of the present invention, the dispersion compensation device can further comprise a first grating fiber connected to an output terminal of the first optical unit through which light reflected by the chirped grating fiber- is furnished, for reflecting at least light with a wavelength of $\lambda_j$, and a second grating fiber connected to an output terminal of the second optical unit through which light reflected by the chirped grating fiber is furnished, for reflecting at least light with a wavelength of $\lambda_i$.

In accordance with another preferred embodiment of the present invention, the dispersion compensation device can further comprise a first grating fiber connected between the first optical means and the chirped grating fiber, for reflecting at least light with a wavelength of $\lambda_j$, and a second grating fiber connected between the second optical means and the chirped grating fiber, for reflecting at least light with a wavelength of $\lambda_i$.

In accordance with another preferred embodiment of the present invention, the dispersion compensation device can further comprise a first grating fiber connected to an input terminal of the first optical unit through which at least the lightwave signal with a wavelength of $\lambda_i$ is input, for reflecting at least light with a wavelength of $\lambda_j$, and a second grating fiber connected to an input terminal of the second optical unit through which at least the lightwave signal with a wavelength of $\lambda_j$ is input, for reflecting at least light of a wavelength of $\lambda_i$.

In accordance with another preferred embodiment of the present invention, the dispersion compensation device can further comprise a second chirped grating fiber having an end portion whose grating pitch is shorter and which is connected to the first optical coupler and another end portion whose grating pitch is longer and which is connected to the second optical coupler. The first optical coupler is connected to both the first and second chirped gratings so that the first optical coupler divides at least the lightwave signal of a wavelength of $\lambda_i$ applied thereto into two parts and guides them to the first and second chirped gratings, respectively, and then combines light reflected by the first chirped grating with light reflected by the second chirped grating and furnishes the combined light. Similarly, the second optical coupler is connected to both the first and second chirped gratings so that the second optical coupler divides at least the lightwave signal of a wavelength of $\lambda_j$ applied thereto into two parts and guides them to the first and second chirped gratings, respectively, and then combines light reflected by the first chirped grating with light reflected by the second chirped grating and furnishes the combined light.

Further objects and advantages of the present invention will be apparent from the following description of the preferred embodiments of the invention as illustrated in the accompanying drawings.

DETAILED DESCRIPTION OF THE PREFERRED EMBODIMENTS

First Embodiment

Figure 1:
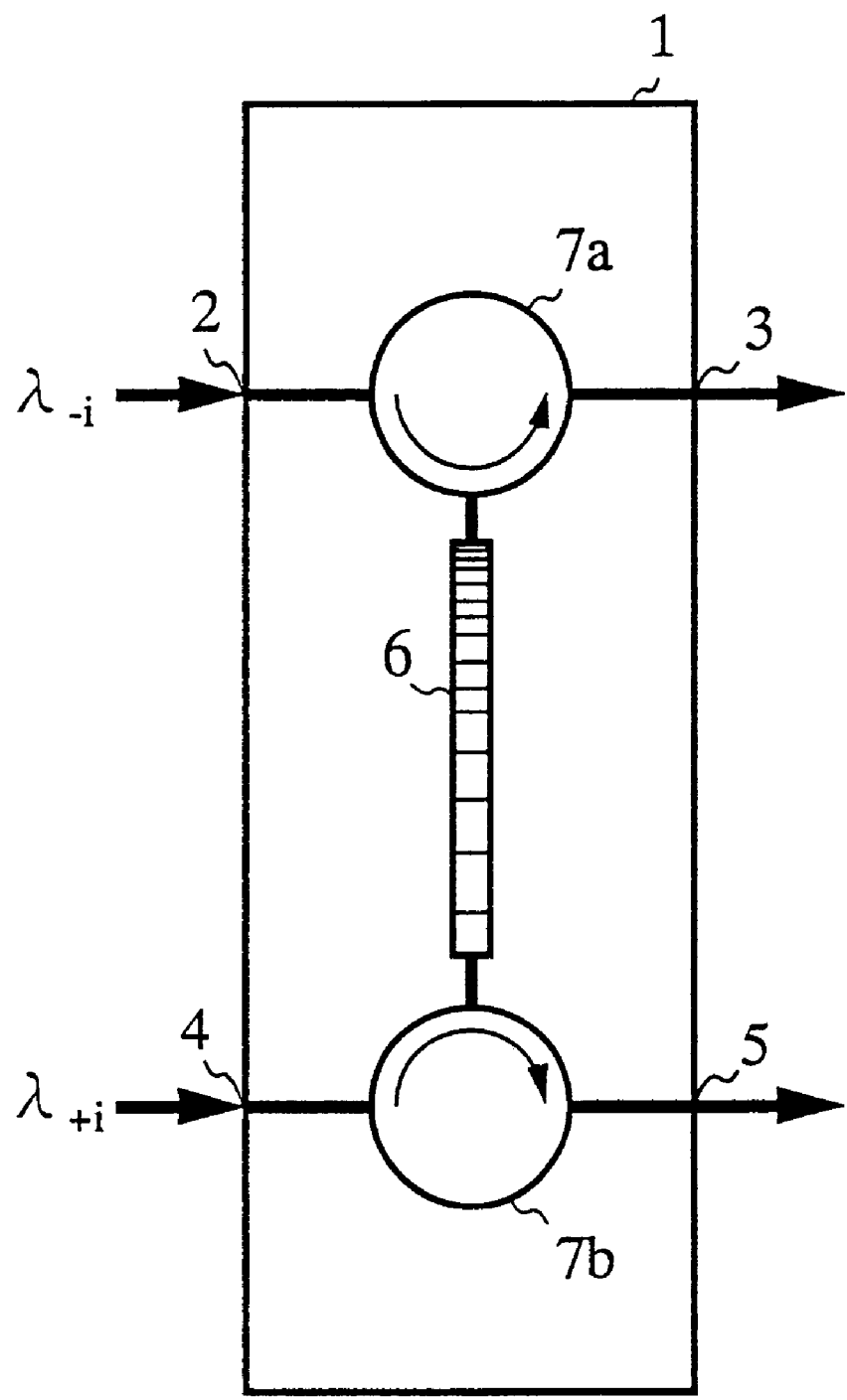
FIG. 1 is a block diagram showing the structure of a dispersion compensation device according to a first embodiment of the present invention.

Referring next to FIG. 1, there is illustrated a block diagram showing the structure of a dispersion compensation device according to a first embodiment of the present invention. In the figure, reference numeral 1 denotes a dispersion compensation device, 2 denotes a first input terminal for receiving a lightwave signal with a wavelength of $\lambda_{-i}$ which requires a positive dispersion compensation, 3 denotes a first output terminal via which the dispersion-compensated lightwave signal with a wavelength of $\lambda_{-i}$ is furnished, 4 denotes a second input terminal for receiving a lightwave signal with a wavelength of $\lambda_{+i}$ which requires a negative dispersion compensation, and 5 denotes a second output terminal via which the dispersion-compensated lightwave signal with a wavelength of $\lambda_{+i}$ is furnished. In addition, reference numeral 6 denotes a chirped grating fiber, 7a denotes a first optical circulator having an intermediate terminal connected to one end portion of the chirped grating fiber 6 with a smaller grating pitch (or spacing) as compared with that of the other end portion of the chirped grating fiber 6, and 7b denotes a second optical circulator having an intermediate terminal connected to the other portion of the chirped grating fiber 6 with a larger grating pitch. The first optical circulator 7a has an input terminal connected to the first input terminal 2 and an output terminal connected to the first output terminal 3. Similarly, the second optical circulator 7b has an input terminal connected to the second input terminal 4 and an output terminal connected to the second output terminal 5. The dispersion compensation device 1 thus can introduce dispersion compensations of the same absolute amount but of opposite sign into both two input lightwave signals applied thereto by way of the first and second input terminals, respectively, by bidirectionally guiding them to the single chirped grating fiber 6 from the two ends of the chirped grating fiber, respectively. In this specification, the dispersion compensation device 1 is hereafter referred to as BiDCG (or Bipolar Dispersion compensation Grating).

In operation, a lightwave signal with a wavelength of $\lambda_{-i}$, which has been input to the BiDCG 1 by way of the first input terminal 2, is furnished to the chirped grating fiber 6 by way of the first optical circulator 7a. As shown in FIG. 1, the grating pitch or spacing of the chirped grating fiber 6 gradually increases along its length extending from one end portion connected to the first optical circulator 7a to the other end portion connected to the second optical circulator 7b. Therefore, a light component with a shorter wavelength in the lightwave signal with a wavelength of $\lambda_{-i}$ is reflected from a point in the chirped grating fiber 6 that is closer to the first optical circulator 7a, and a light component with a longer wavelength in the lightwave signal with a wavelength of $\lambda_{-i}$ is reflected from a point in the chirped grating fiber 6 that is farther from the first optical circulator 7a. As a result, the longer the wavelength of a light component included in the lightwave signal with a wavelength of $\lambda_{-i}$ input via the first input terminal 2, the more it is delayed by the chirped grating fiber 6. In other words, the lightwave signal with a wavelength of $\lambda_{-i}$ input via the first input terminal 2 is positively dispersed. On the other hand, a lightwave signal with a wavelength of $\lambda_{+i}$, which has been input to the BiDCG 1 by way of the second input terminal 4, is furnished to the chirped grating fiber 6 by way of the second optical circulator 7b. Since the grating pitch of the chirped grating fiber 6 gradually decreases along its length extending from the other end portion connected to the second optical circulator 7b to the end portion connected to the first optical circulator 7a, as previously mentioned, a light component with a longer wavelength in the lightwave signal with a wavelength of $\lambda_{+i}$ is reflected from a point in the chirped grating fiber 6 that is closer to the second optical circulator 7b, and a light component with a shorter wavelength in the lightwave signal with a wavelength of $\lambda_{+i}$ is reflected from a point in the chirped grating fiber 6 that is farther from the second optical circulator 7b. As a result, the shorter the wavelength of a light component included in the lightwave signal with a wavelength of $\lambda_{+i}$ input via the second input terminal 4, the more it is delayed by the chirped grating fiber 6. In other words, the lightwave signal with a wavelength of $\lambda_{+i}$ input via the second input terminal 4 is negatively dispersed.

Figure 2:
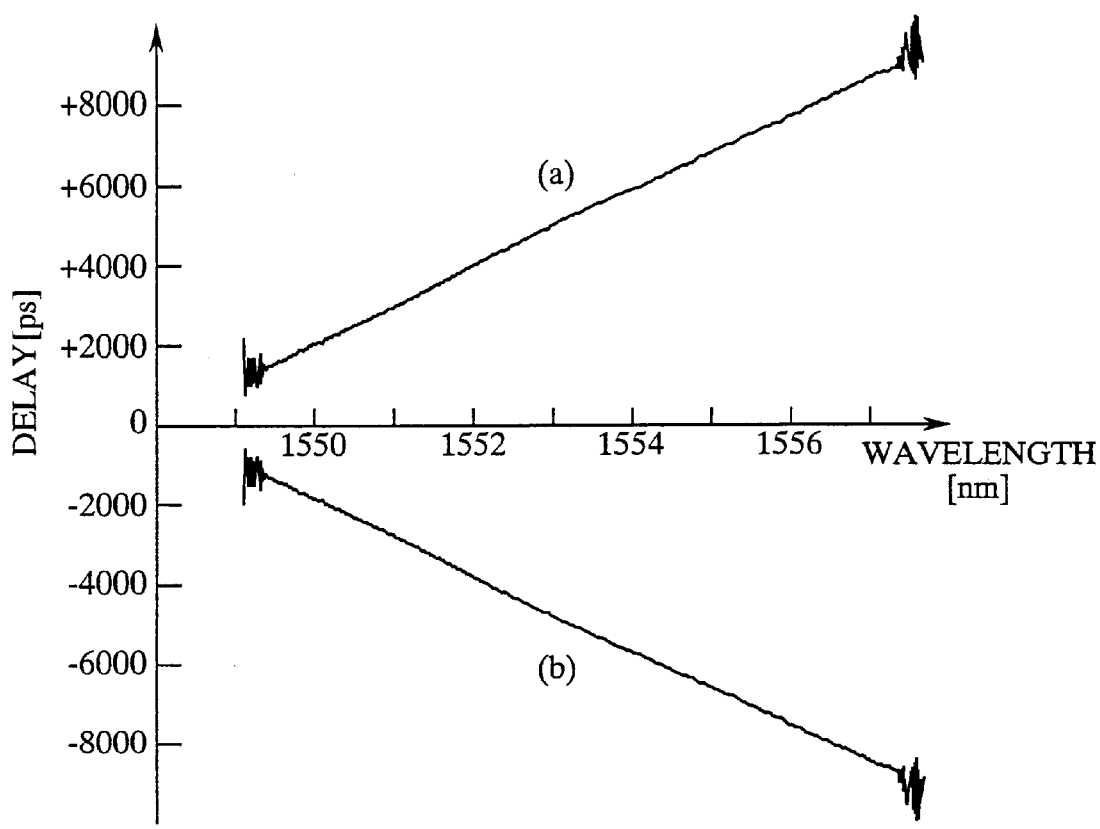
FIG. 2 is a graph showing the group delay characteristic of the dispersion compensation device according to the first embodiment of the present invention.

Referring next to FIG. 2, there is illustrated a graph showing the group delay characteristics of the BiDCG 1 according to the first embodiment of the present invention. In the figure, the plot (a) shows the group delay characteristic of the BiDCG 1 in the case where the lightwave signal with a wavelength of $\lambda_{-i}$ applied to the first input terminal 2 is furnished by way of the first output terminal 3 and the lightwave signal is therefore positive-dispersed by the BiDCG 1, as previously explained. The other plot (b) shows the group delay characteristic of the BiDCG 1 in the case where the lightwave signal with a wavelength of $\lambda_{+i}$ applied to the second input terminal 4 is furnished by way of the second output terminal 5 and the lightwave signal is therefore negative-dispersed by the BiDCG 1, as previously explained.

As mentioned above, the BiDCG 1 according to the first embodiment of the present invention can provide dispersion compensations of the same absolute amount but of opposite sign for both two different input lightwave signals, respectively, using the single chirped grating fiber 6. Accordingly, the space required for mounting the BiDCG 1 and the manufacturing cost can be reduced largely as compared with in the case of the use of a prior art DCG.

Figure 3:
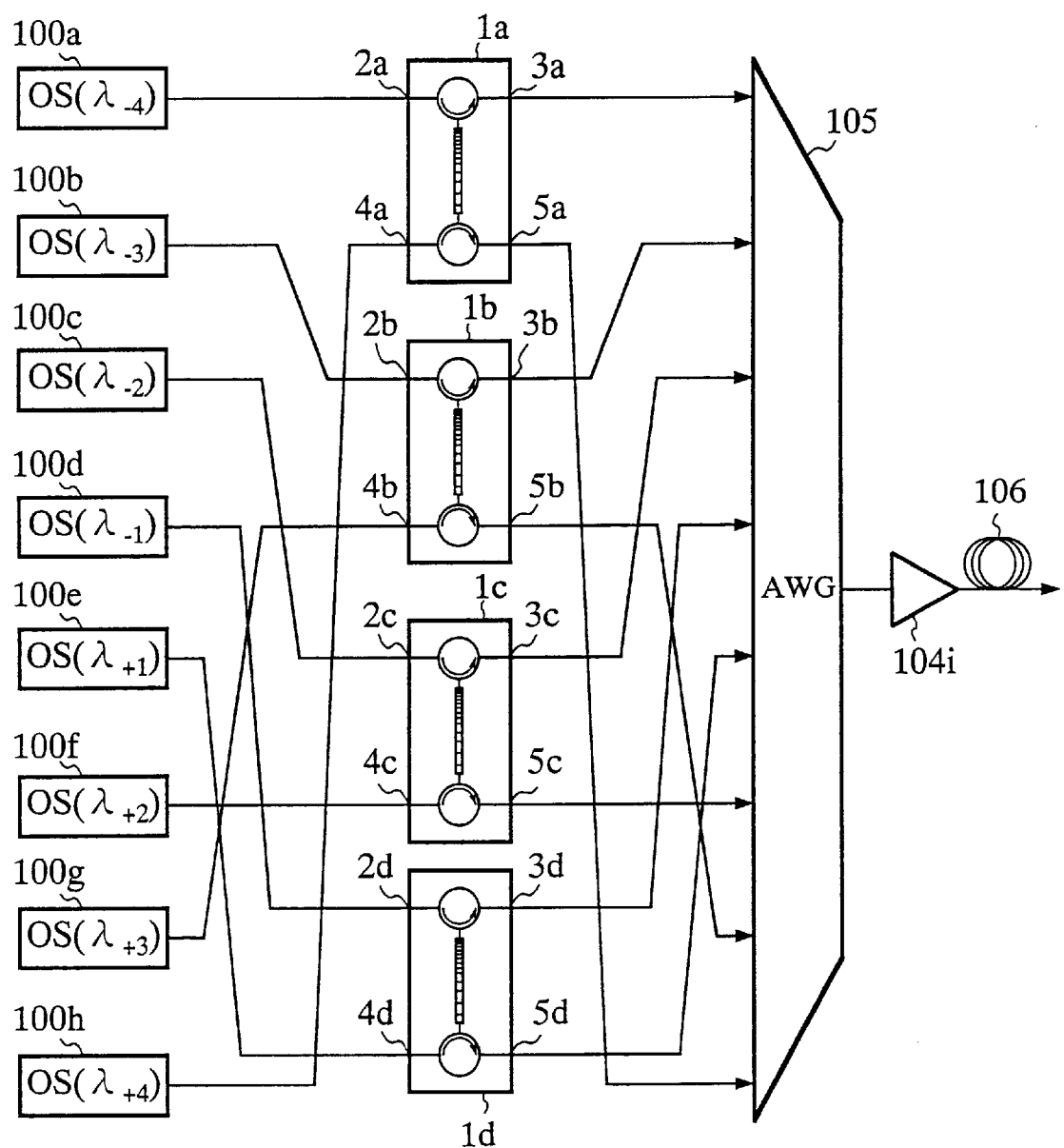
FIG. 3 is a block diagram showing the structure of an example of a sending terminal station that can perform a pre dispersion compensation using a plurality of dispersion compensation devices according to the first embodiment of the present invention.

Referring next to FIG. 3, there is illustrated a block diagram showing the structure of an example of a sending terminal station that performs a pre dispersion compensation using a plurality of BiDCGs according to the first embodiment of the present invention. In the figure, reference numerals 100a to 100h denote optical sources or OSs for sending out lightwave signals with different wavelengths of $\lambda_{-4}$, $\lambda_{-3}$, $\lambda_{-2}$, $\lambda_{-1}$, $\lambda_{+1}$, $\lambda_{+2}$, $\lambda_{+3}$, $\lambda_{+4}$, respectively, 1a to 1d each denotes a BiDCG according to the first embodiment of the present invention, 104i denotes a light amplifier, and 105 denotes an optical multiplexer. Preferably, an array type waveguide grating or AWG is used as the optical multiplexer 105. In addition, reference numeral 106 denotes a transmission fiber in which dispersion management is carried out. The BiDCG 1a is so constructed as to introduce dispersion compensations of ±3,500 ps/nm into two input lightwave signals which it receives by way of its two input terminals 2a and 4a, respectively. The BiDCG 1b is so constructed as to introduce dispersion compensations of ±2,500 ps/nm into two input lightwave signals which it receives by way of its two input terminals 2b and 4b, respectively. The BiDCG 1c is so constructed as to introduce dispersion compensations of ±1,500 ps/nm into two input lightwave signals which it receives by way of its two input terminals 2c and 4c, respectively. The BiDCG 1d is so constructed as to introduce dispersion compensations of ±500 ps/nm into two input lightwave signals which it receives by way of its two input terminals 2d and 4d, respectively.

Next, a description will be made as to the operation of the sending terminal station. The BiDCG 1a provides a positive amount of dispersion of +3,500 ps/nm for the lightwave signal with a wavelength of $\lambda_{-4}$ from OS 100a which it receives by way of the first input terminal 2a, and also provides a negative amount of dispersion of −3,500 ps/nm for the lightwave signal with a wavelength of $\lambda_{+4}$ from OS 100h which it receives by way of the second input terminal 4a. Both the positive-dispersed lightwave signal with a wavelength of $\lambda_{-4}$ and the negative-dispersed lightwave signal with a wavelength of $\lambda_{+4}$ are respectively furnished, by way of the first and second output terminals 3a and 5a, to the optical multiplexer 105. The BiDCG 1b provides a positive amount of dispersion of +2,500 ps/nm for the lightwave signal with a wavelength of $\lambda_{-3}$ from OS 100b which it receives by way of the first input terminal 2b, and also provides a negative amount of dispersion of −2,500 ps/nm for the lightwave signal with a wavelength of $\lambda_{+3}$ from OS 100 g which it receives by way of the second input terminal 4b. Both the positive-dispersed lightwave signal with a wavelength of $\lambda_{-3}$ and the negative-dispersed lightwave signal with a wavelength of $\lambda_{+3}$ are respectively furnished, byway of the first and second output terminals 3b and 5b, to the optical multiplexer 105. The BiDCG 1c provides a positive amount of dispersion of +1,500 ps/nm for the lightwave signal with a wavelength of $\lambda_{-2}$ from OS 100c which it receives by way of the first input terminal 2c, and also provides a negative amount of dispersion of −1,500 ps/nm for the lightwave signal with a wavelength of $\lambda_{+2}$ from OS 100f which it receives by way of the second input terminal 4c. Both the positive-dispersed lightwave signal with a wavelength of $\lambda_{-2}$ and the negative-dispersed lightwave signal with a wavelength of $\lambda_{+2}$ are respectively furnished, by way of the first and second output terminals 3c and 5c, to the optical multiplexer 105. The BiDCG 1d provides a positive amount of dispersion of +500 ps/nm for the lightwave signal with a wavelength of $\lambda_{-1}$ from OS 100d which it receives by way of the first input terminal 2d, and also provides a negative amount of dispersion of −500 ps/nm for the lightwave signal with a wavelength of $\lambda_{+1}$ from OS 100e which it receives by way of the second input terminal 4d. Both the positive-dispersed lightwave signal with a wavelength of $\lambda_{-1}$ and the negative-dispersed lightwave signal with a wavelength of $\lambda_{+1}$ are respectively furnished, by way of the first and second output terminals 3d and 5d, to the optical multiplexer 105. After that, the optical multiplexer 105 multiplexes those lightwave signals that have undergone the predetermined dispersion compensations performed by the four BiDCGs 1a to 1d, respectively. The light amplifier 104i then amplifies the group of wavelength-multiplexed lightwave signals and sends out it onto the transmission fiber 106.

Figure 9:
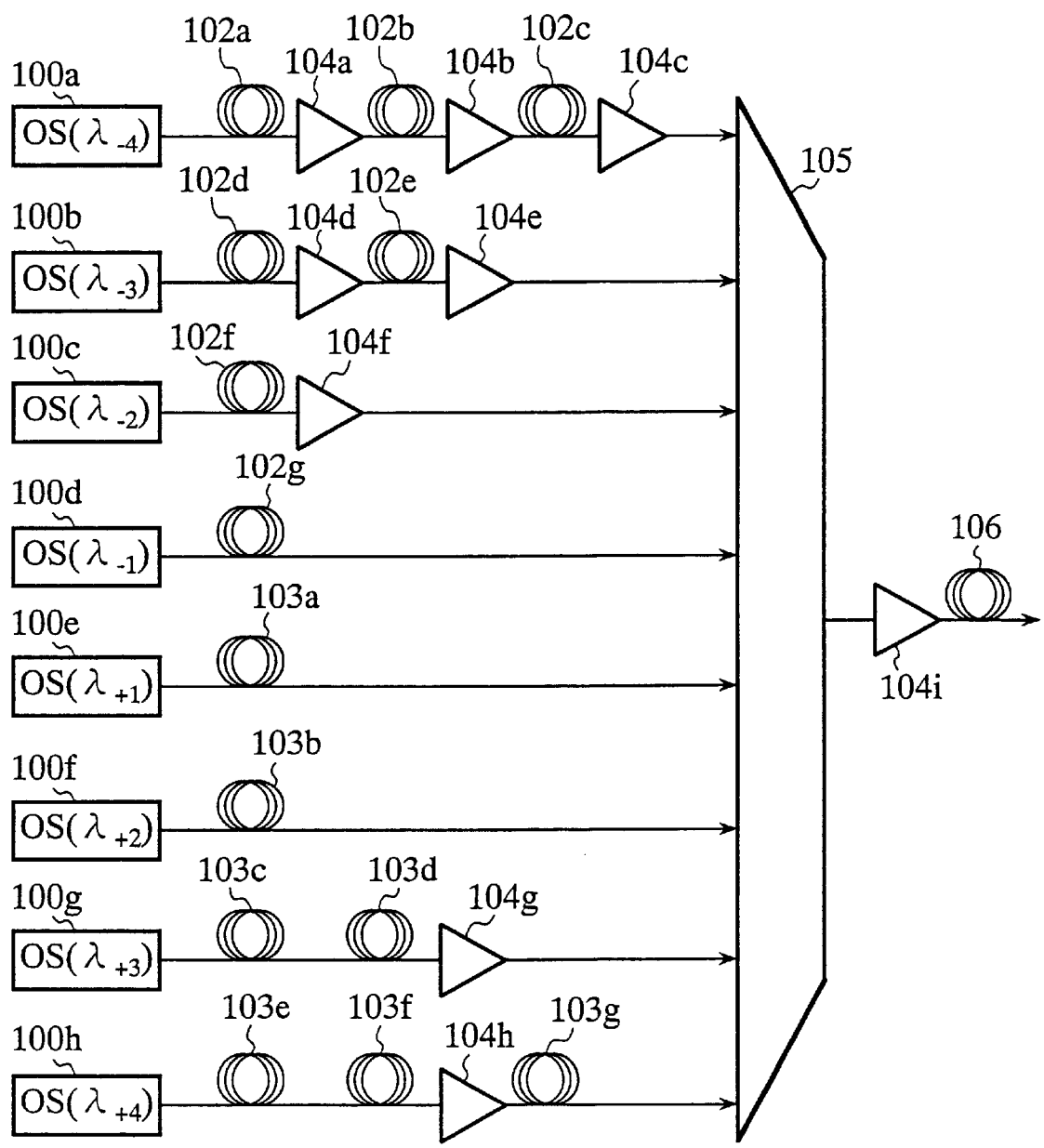
FIG. 9 is a block diagram showing the structure of an example of a wavelength multiplexing sending terminal station including eight optical sources and a plurality of prior art dispersion compensation devices each for performing a pre dispersion compensation.
Figure 10:
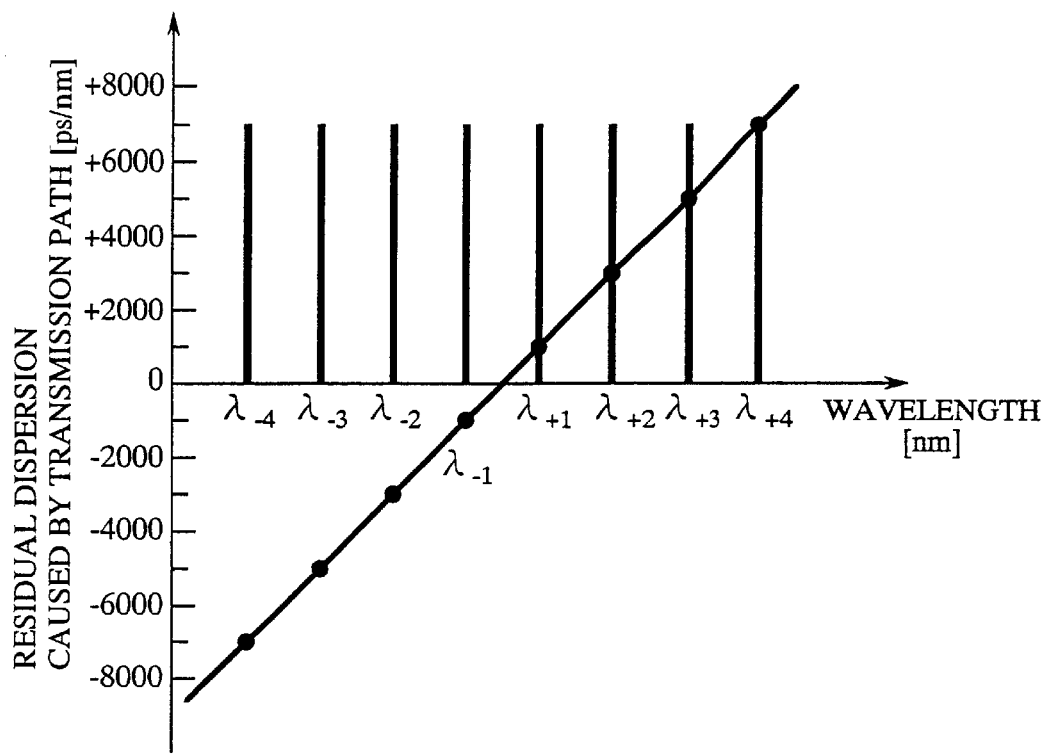
FIG. 10 is a graph showing an example of residual dispersion caused by a transmission fiber.
Figure 11:
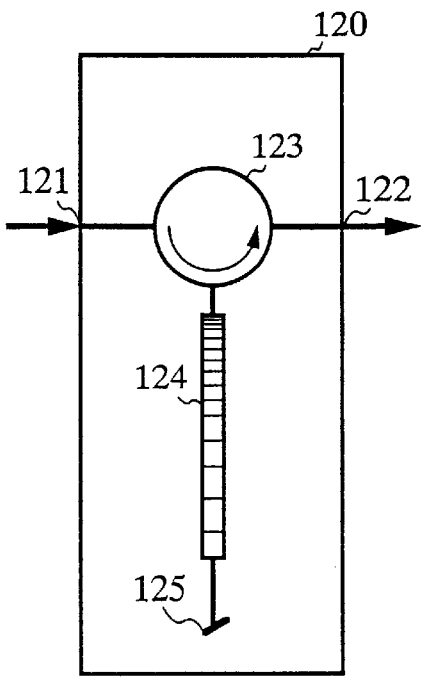
FIG. 11 is a block diagram showing the structure of a prior art dispersion compensation device.
Figure 12A:
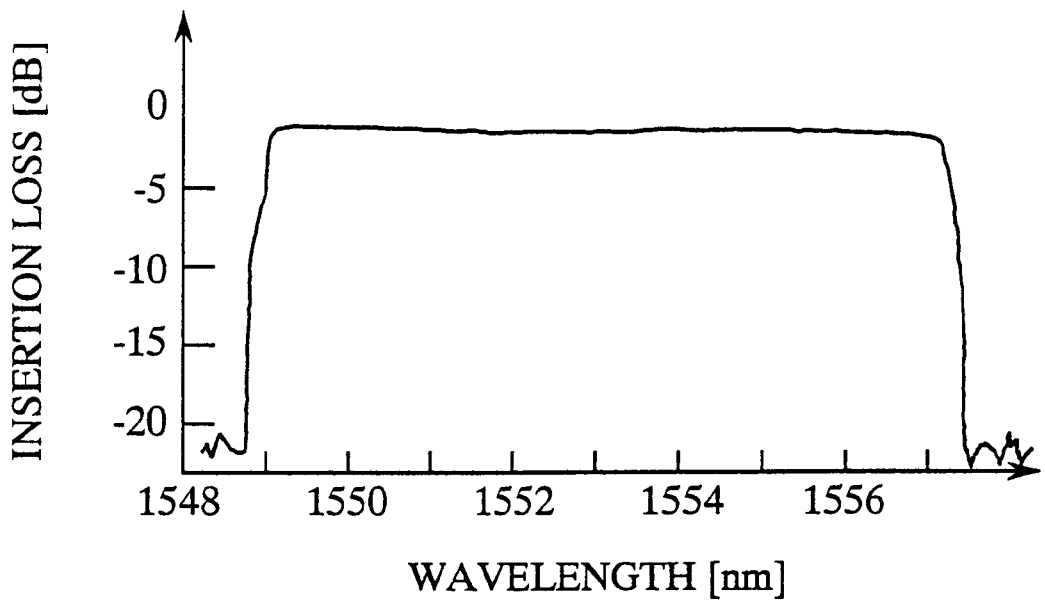
FIG. 12(a) is a graph showing the reflection characteristic of the prior art dispersion compensation device as shown in FIG. 11.
Figure 12B:
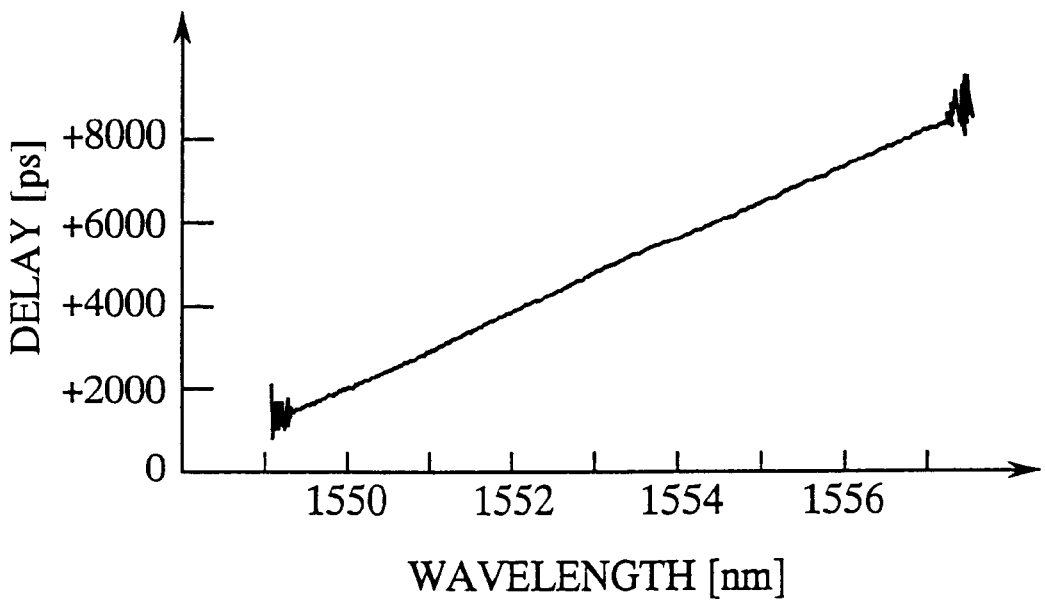
FIG. 12(b) is a graph showing the group delay characteristic of the prior art dispersion compensation device as shown in FIG. 11.
Figure 13:
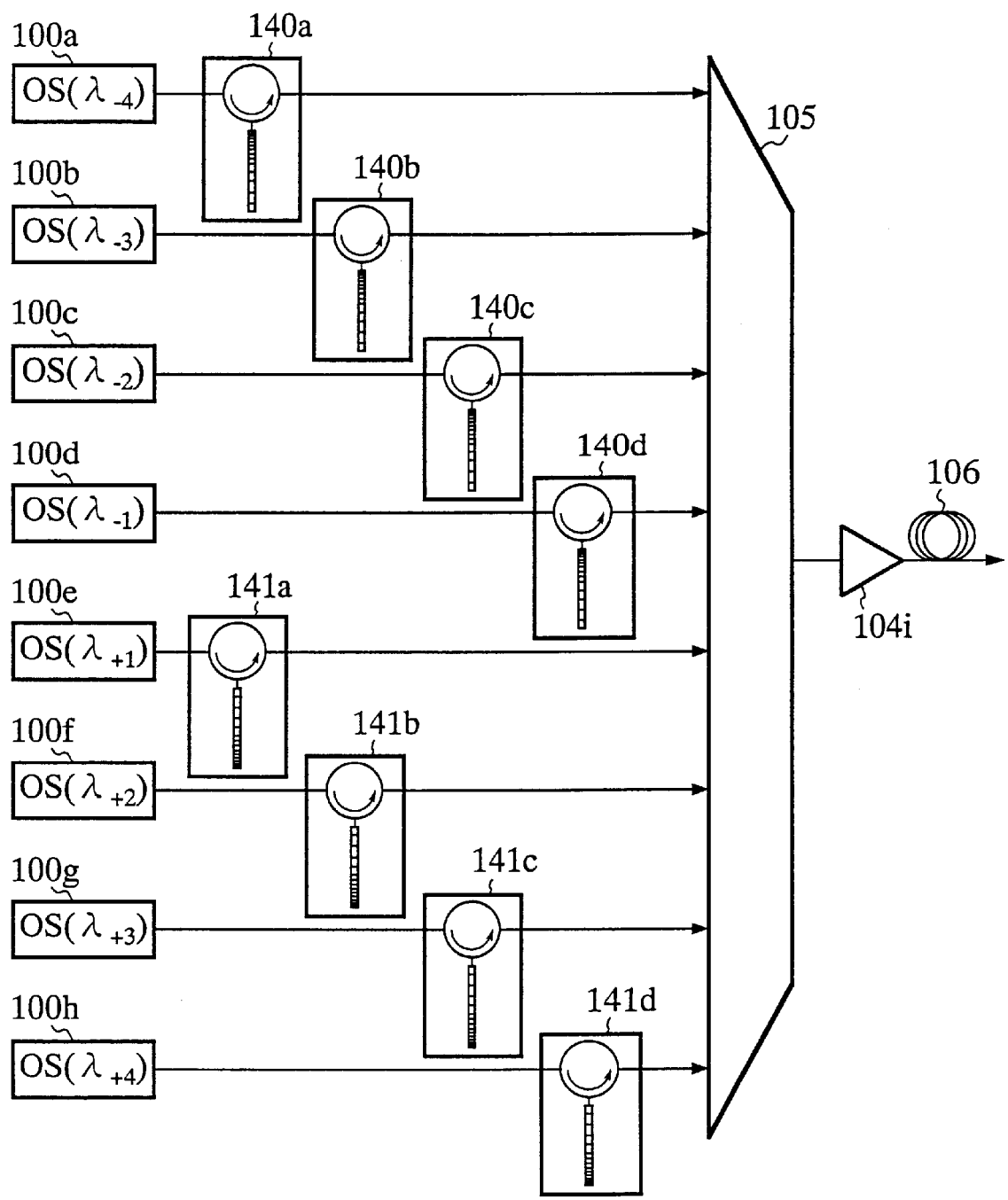
FIG. 13 is a block diagram showing the structure of an example of a wavelength multiplexing sending terminal station including eight optical sources and using a plurality of prior art dispersion compensation devices as shown in FIG. 11.

Accordingly, since the sending terminal station as shown in FIG. 3 employs the plurality of BiDCGs 1a to 1d according to the first embodiment of the present invention, the space required for mounting the sending terminal station and the manufacturing cost can be reduced to close to half of those in the case of using prior art DCGs. In addition, the space required for mounting the sending terminal station is reduced to one quarter or less that required for mounting the prior art sending terminal station, as shown in FIG. 9, using a plurality of dispersion compensation fibers. Furthermore, since the insertion loss produced by each of the plurality of BiDCGs 1a to 1d is considerably low as compared with that produced by such a conventional dispersion compensation fiber, there is no need to provide a light amplifier for compensating the insertion loss produced in each transmission line for each lightwave signal of a certain wavelength.

Figure 4:
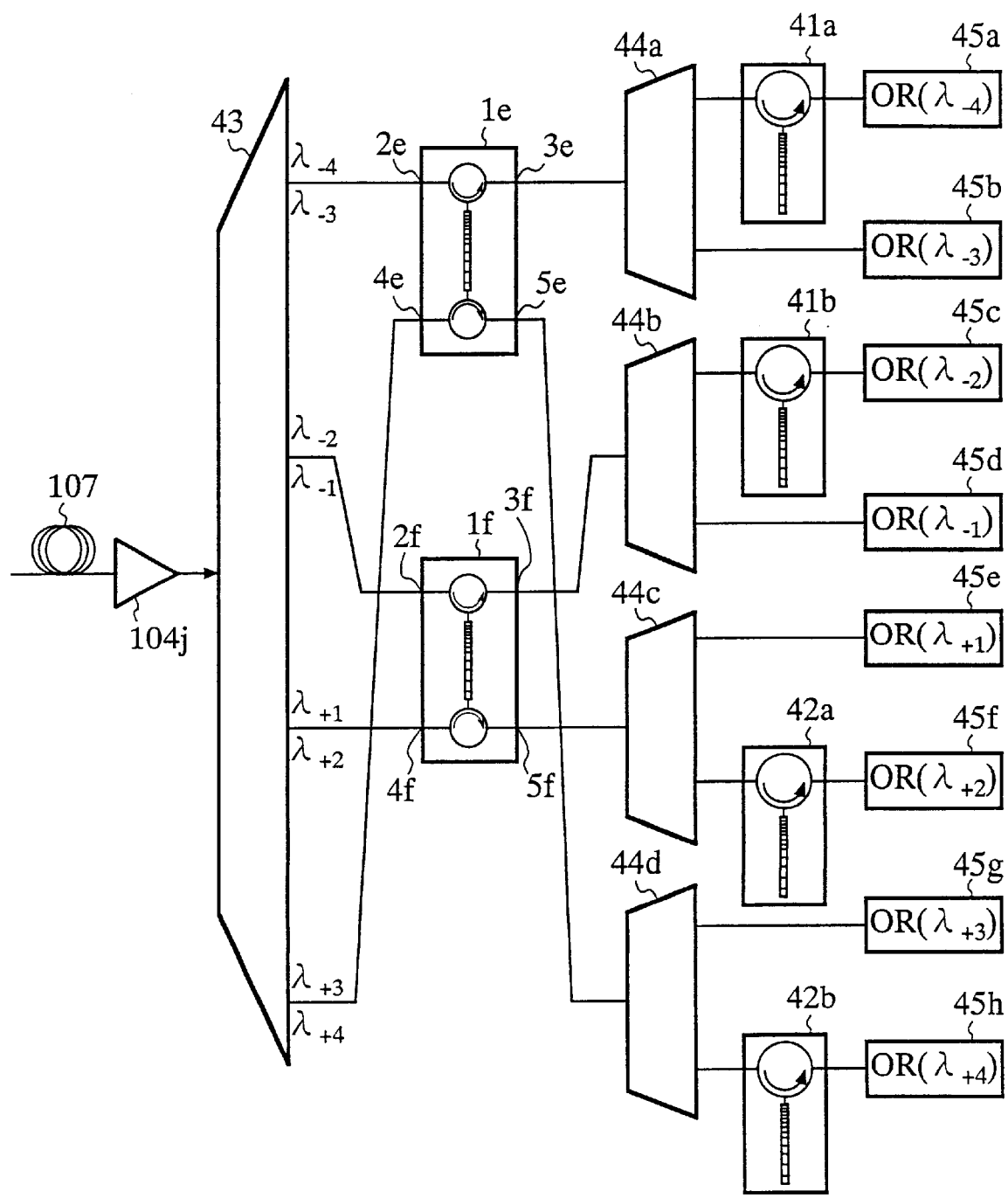
FIG. 4 is a block diagram showing the structure of an example of a receiving terminal station that can perform a post dispersion compensation using a plurality of dispersion compensation devices according to the first embodiment of the present invention.

Referring next to FIG. 4, there is illustrated a block diagram showing the structure of an example of a receiving terminal station that performs a post dispersion compensation using a plurality of BiDCGs according to the first embodiment of the present invention. In the figure, reference numeral 1e denotes a first BiDCG that is so constructed as to introduce dispersion compensations of ±2,500 ps/nm into two input lightwave signals, 1f denotes a second BiDCG that is so constructed as to introduce dispersion compensations of ±500 ps/nm into two input lightwave signals, 41a denotes a first DCG that is so constructed as to introduce a positive dispersion compensation of +1000 ps/nm into an input lightwave signal, 41b denotes a second DCG that is so constructed as to introduce a positive dispersion compensation of +500 ps/nm into an input lightwave signal, 42a denotes a third DCG that is so constructed as to introduce a negative dispersion compensation of −1,000 ps/nm into an input lightwave signal, 42b denotes a fourth DCG that is so constructed as to introduce a negative dispersion compensation of −500 ps/nm into an input lightwave signal, 107 denotes a transmission fiber, 104j denotes a light amplifier, 43 denotes a 1:4 optical demultiplexer, 44a to 44d denote 1:2 optical demultiplexers, and 45a to 45h denote optical receivers or ORs for receiving lightwave signals with different wavelengths of $\lambda_{-4}$, $\lambda_{-3}$, $\lambda_{-2}$, $\lambda_{-1}$, $\lambda_{+1}$, $\lambda_{+2}$, $\lambda_{+3}$, $\lambda_{+4}$, respectively.

Next, a description will be made as to the operation of the receiving terminal station. It is assumed that the lightwave signals with different wavelengths of $\lambda_{-4}$, $\lambda_{-3}$, $\lambda_{-2}$, $\lambda_{-1}$, $\lambda_{+1}$, $\lambda_{+2}$, $\lambda_{+3}$, $\lambda_{+4}$ need post dispersion compensations of +3,500 ps/nm, +2,500 ps/nm, +1,500 ps/nm, +500 ps/nm, −500 ps/nm, −1,500 ps/nm, −2,500 ps/nm, and −3,500 ps/nm, respectively. The optical demultiplexer 43 divides wavelength-multiplexed light including eight lightwave signals of different wavelengths, which has been transmitted by way of the transmission fiber 107 and amplified by the light amplifier 104j, into four groups each including two light waves. Among them, a first group comprised of the lightwave signal with a wavelength of $\lambda_{-4}$ and the lightwave signal with a wavelength of $\lambda_{-3}$ is applied to the first input terminal 2e of the first BiDCG 1e, and a second group comprised of the lightwave signal with a wavelength of $\lambda_{+4}$ and the lightwave signal with a wavelength of $\lambda_{+3}$ is applied to the second input terminal 4e of the first BiDCG 1e. The first BiDCG 1e then introduces a positive dispersion compensation of +2,500 ps/nm into both the lightwave signal with a wavelength of $\lambda_{-4}$ and the lightwave signal with a wavelength of $\lambda_{-3}$ and also introduces a negative dispersion compensation of −2,500 ps/nm into both the lightwave signal with a wavelength of $\lambda_{+4}$ and the lightwave signal with a wavelength of $\lambda_{+3}$. Accordingly, the desired dispersion compensations are provided for both the lightwave signal with a wavelength of $\lambda_{-3}$ and the lightwave signal with a wavelength of $\lambda_{+3}$. On the other hand, a further positive dispersion compensation of +1,000 ps/nm is needed for the lightwave signal with a wavelength of $\lambda_{-4}$, and a further negative dispersion compensation of −1,000 ps/nm is needed for the lightwave signal with a wavelength of $\lambda_{+4}$. The optical demultiplexer 44a then isolates the first group comprised of the lightwave signal with a wavelength of $\lambda_{-4}$ and the lightwave signal with a wavelength of $\lambda_{-3}$ from each other. The isolated lightwave signal with a wavelength of $\lambda_{-4}$ is input to the first DCG 41a. The first DCG 41a then introduces the remaining positive dispersion compensation into the lightwave signal with a wavelength of $\lambda_{-4}$. The lightwave signal with a wavelength of $\lambda_{-4}$ dispersion-compensated this way is input to the first OR 45a, and the already-dispersion-compensated lightwave signal with a wavelength of $\lambda_{-3}$ from the optical demultiplexer 44a is input to the second OR 45b, just as it is. Similarly, the optical demultiplexer 44d isolates the second group comprised of the lightwave signal with a wavelength of $\lambda_{+4}$ and the lightwave signal with a wavelength of $\lambda_{+3}$ from each other, and the isolated lightwave signal with a wavelength of $\lambda_{+4}$ is input to the fourth DCG 42b. The fourth DCG 42b then introduces the remaining negative dispersion compensation into the lightwave signal with a wavelength of $\lambda_{+4}$. The lightwave signal with a wavelength of $\lambda_{+4}$ dispersion-compensated this way is input to the eighth OR 45h, and the already-dispersion-compensated lightwave signal with a wavelength of $\lambda_{+3}$ from the optical demultiplexer 44d is input to the seventh OR 45g, just as it is.

Like the above-mentioned two groups of lightwave signals, a third group comprised of the lightwave signal with a wavelength of $\lambda_{-2}$ and the lightwave signal with a wavelength of $\lambda_{-1}$ input to the first input terminal 2f of the second BiDCG 1f, and a fourth group comprised of the lightwave signal with a wavelength of $\lambda_{+2}$ and the lightwave signal with a wavelength of $\lambda_{+1}$ input to the second input terminal 4f of the second BiDCG 1f. After that, the second BiDCG 1f and the second and third DCGs 41b and 42a then introduce desired dispersion compensations into those lightwave signals with wavelengths of $\lambda_{-2}$, $\lambda_{-1}$, $\lambda_{+2}$, and $\lambda_{+1}$ in cooperation with each other. The dispersion-compensated lightwave signals with wavelengths of $\lambda_{-2}$, $\lambda_{-1}$, $\lambda_{+2}$, and $\lambda_{+1}$ are then input to the third through sixth ORs 45c to 45f, respectively.

Thus, the implementation of the receiving terminal station using the two BiDCGs 1e and 1f makes it possible to reduce the space required for mounting the receiving terminal station and the manufacturing cost as compared with in the case of using prior art DCGs.

Second Embodiment

As previously explained, the dispersion compensation device 1 according to the first embodiment of the present invention is so constructed as to allow two lightwave signals of different wavelengths to enter the single chirped grating fiber 6 from two opposite directions. Therefore, there is apprehension about cross talk light. Next, a description will be made as to cross talk light with reference to FIG. 1. For example, slight part of a lightwave signal with a wavelength of $\lambda_{-i}$, which has been input to the BiDCG 1 by way of the first input terminal 2, can appear at the second output terminal 5, because, in general, the reflectivity of the chirped grating fiber 6 is not 100%. Similarly, slight part of a lightwave signal with a wavelength of $\lambda_{+i}$, which has been input to the BiDCG 1 by way of the second input terminal 4, can appear at the first output terminal 3. Thus, light with a low amplitude but with an undesired wavelength as well as a lightwave signal with a desired wavelength can appear at both of the first and second output terminals 3 and 5. Such light is hereafter referred to as cross talk light. Even though cross talk light is input to the optical multiplexer 105 as shown in FIG. 3, if the multiplexer 105 is constructed of an AWG, the cross talk light does not appear at the output terminal of the multiplexer 105. This is because among lightwave signals applied to one input terminal of an AWG, only light of a certain wavelength inherent in the input terminal can appear at the output terminal of the AWG and therefore any light with a wavelength that differs from the certain wavelength cannot appear at the output terminal. Thus, cross talk light is eliminated in an AWG. By comparison, if the optical multiplexer 105 is constructed of a star coupler, when light of a desired wavelength, which should be input originally, and cross talk light of a wavelength that differs from the desired wavelength can be input to each input terminal of the star coupler, multiplexing the light of a desired wavelength and the cross talk light using the star coupler can give rise to a so-called coherent cross talk problem. The problem is that light with a certain wavelength inherent in each input terminal interferes with cross talk light with the same wavelength input by way of another corresponding input terminal.

Figure 5:
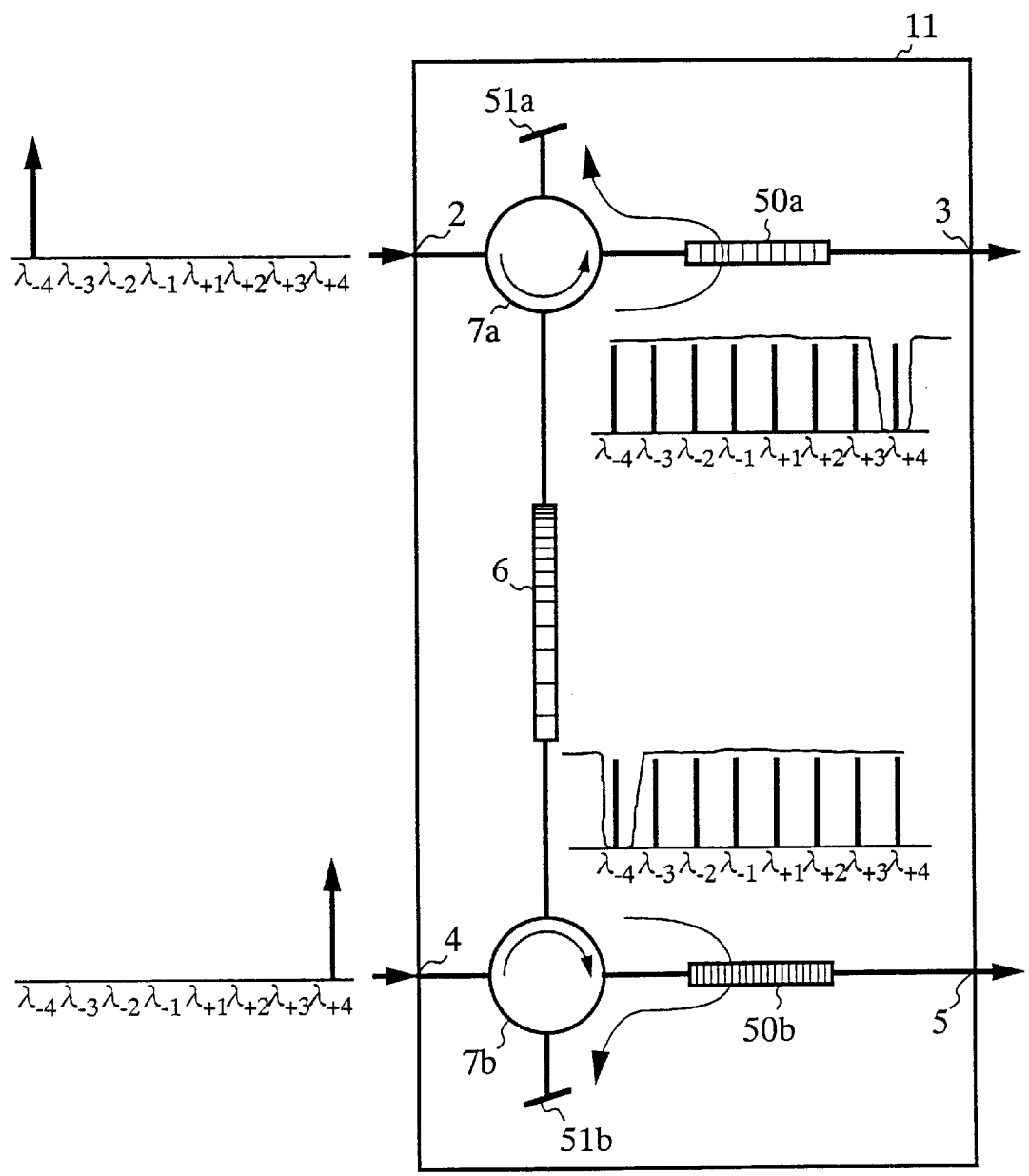
FIG. 5 is a block diagram showing the structure of a dispersion compensation device according to a second embodiment of the present invention.

Referring next to FIG. 5, there is illustrated a block diagram showing the structure of a dispersion compensation device according to a second embodiment of the present invention, which is so constructed as to prevent the generation of coherent cross talk. In the figure, the same reference numerals as shown in FIG. 1 designate the same components as those of the dispersion compensation device according to the above-mentioned first embodiment of the present invention. Reference numeral 11 denotes a dispersion compensation device or BiDCG of the second embodiment, 50a denotes a first grating fiber connected to an output terminal of a first optical circulator 7a, for reflecting cross talk light that originates from a lightwave signal input to the BiDCG 11 by way of a second input terminal 4, 50b denotes a second grating fiber connected to an output terminal of a second optical circulator 7b, for reflecting cross talk light that originates from a lightwave signal input to the BiDCG 11 by way of a first input terminal 2, 51a denotes a first reflectionless termination for absorbing cross talk light reflected by the first grating fiber 50a, and 51b denotes a second reflectionless termination for absorbing cross talk light reflected by the second grating fiber 50b. FIG. 5 shows an example of the structure of the dispersion compensation device of the second embodiment in which a lightwave signal with a wavelength of $\lambda_{-4}$ is input by way of the first input terminal 2 and a lightwave signal with a wavelength of $\lambda_{+4}$ is input by way of the second input terminal 4, and the first grating fiber 50a is adapted to reflect cross talk light with a wavelength of $\lambda_{+4}$ and the second grating fiber 50b is adapted to reflect cross talk light with a wavelength of $\lambda_{-4}$.

Next, a description will be made as to the operation of the BiDCG 11. Although most of the lightwave signal with a wavelength of $\lambda_{-4}$, which has been input to the dispersion compensation device 11 by way of the first input terminal 2, is reflected by the chirped grating fiber 6, slight part of the lightwave signal appears at the intermediate terminal of the second optical circulator 7b and then reaches the second grating fiber 50b by way of the second optical circulator 7b. The second grating fiber 50b reflects the cross talk light with a wavelength of $\lambda_{-4}$ backward and toward the second optical circulator 7b. After that, the cross talk light with a wavelength of $\lambda_{-4}$ is absorbed by the second reflectionless termination 51b. Thus, the BiDCG 11 of the second embodiment can prevent the cross talk light with a wavelength of $\lambda_{-4}$ from appearing at the second output terminal 5. Similarly, although most of the lightwave signal with a wavelength of $\lambda_{+4}$ which has been input to the dispersion compensation device 11 by way of the second input terminal 4, is reflected by the chirped grating fiber 6, slight part of the lightwave signal appears at the intermediate terminal of the first optical circulator 7a and then reaches the first grating fiber 50a by way of the first optical circulator 7a. The first grating fiber 50a reflects the cross talk light with a wavelength of $\lambda_{+4}$ backward and toward the first optical circulator 7a. After that, the cross talk light with a wavelength of $\lambda_{+4}$ is absorbed by the first reflectionless termination 51a. Thus, the BiDCG 11 of the second embodiment can prevent the cross talk light with a wavelength of $\lambda_{+4}$ from appearing at the first output terminal 3. Accordingly, the dispersion compensation device according to the second embodiment of the present invention can provide dispersion compensations of the same absolute amount but of opposite sign for both two different input lightwave signals, respectively, using the single chirped grating fiber 6. In addition, even though a star coupler is connected to the output terminal of the dispersion compensation device according to the second embodiment of the present invention, the dispersion compensation device can prevent the generation of coherent cross talk in the star coupler.

Third Embodiment

As previously mentioned, in a pre dispersion compensation, the coherent cross talk problem can be solved through the use of a plurality of dispersion compensation devices according to the above-mentioned second embodiment as shown in FIG. 5. By contrast, a problem with a post dispersion compensation as shown in FIG. 4 is that light of a certain wavelength, which cannot be eliminated by the optical demultiplexer 43, can cause coherent cross talk and hence reduce the signal quality. In accordance with a third embodiment of the present invention, there is provided a dispersion compensation device that can prevent coherent cross talk even when performing a post dispersion compensation.

Figure 6:
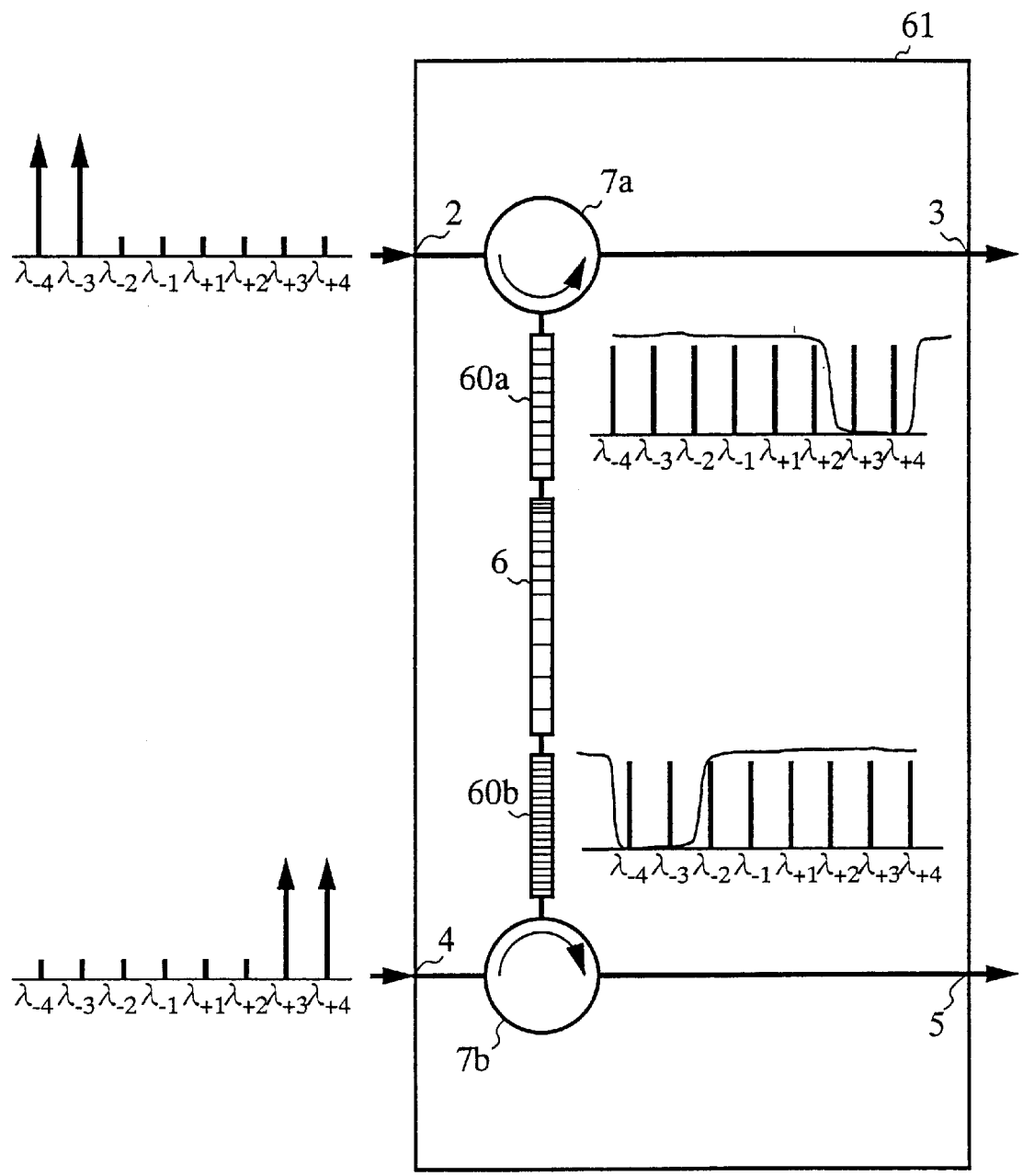
FIG. 6 is a block diagram showing the structure of a dispersion compensation device according to a third embodiment of the present invention.

Referring next to FIG. 6, there is illustrated a block diagram showing the structure of a dispersion compensation device according to the third embodiment of the present invention. In the figure, the same reference numerals as shown in FIG. 1 designate the same components as those of the dispersion compensation device according to the aforementioned first embodiment of the present invention. Reference numeral 61 denotes a dispersion compensation device or BiDCG of the third embodiment of the present invention, 60a denotes a first grating fiber connected to an intermediate terminal of a first optical circulator 7a, for reflecting cross talk light that originates from a lightwave signal input to the BiDCG 61 by way of a second input terminal 4 and then reaches the first grating fiber 60a by way of the chirped grating fiber 6, and 60b denotes a second grating fiber connected to an intermediate terminal of a second optical circulator 7b, for reflecting cross talk light that originates from a lightwave signal input to the BiDCG 61 by way of a first input terminal 2 and then reaches the second grating fiber 60b by way of the chirped grating fiber 6. FIG. 6 shows an example of the structure of the dispersion compensation device of the second embodiment in which both a lightwave signal with a wavelength of $\lambda_{-4}$ and a lightwave signal with a wavelength of $\lambda_{-3}$ are mostly input to the BiDCG 61 by way of the first input terminal 2 and both a lightwave signal with a wavelength of $\lambda_{+4}$ and a lightwave signal with a wavelength of $\lambda_{+3}$ are mostly input to the BiDCG 61 by way of the second input terminal 4, and the first grating fiber 60a is adapted to reflect both cross talk light with a wavelength of $\lambda_{+4}$ and cross talk light with a wavelength of $\lambda_{+3}$ and the second grating fiber 60b is adapted to reflect both cross talk light with a wavelength of $\lambda_{-4}$ and cross talk light with a wavelength of $\lambda_{-3}$. The BiDCG 61 of the third embodiment of the present invention can be used as a substitute for the BiDCG 1e as shown in FIG. 4.

Next, a description will be made as to the operation of a BiDCG without the first and second grating fibers 60a and 60b. While both a lightwave signal with a wavelength of $\lambda_{-4}$ and a lightwave signal with a wavelength of $\lambda_{-3}$ are input to the BiDCG 61 by way of the first input terminal 2, slight amounts of light components with wavelengths of $\lambda_{-2}$ through $\lambda_{+4}$ are also input to the BiDCG 61 by way of the first input terminal 2 because the optical demultiplexer 43 cannot eliminate those light components perfectly. All the light components reach the chirped grating fiber 6 by way of the first optical circulator 7a and are reflected by the chirped grating fiber 6. They then appear at the first output terminal 3. In general, since the chirped grating fiber 6, however, does not have an ideal reflectivity of 100%, slight part of them can reach the second output terminal 5 by way of the second optical circulator 7b. On the other hand, while both a lightwave signal with a wavelength of $\lambda_{+4}$ and a lightwave signal with a wavelength of $\lambda_{+3}$ are input to the BiDCG 61 by way of the second input terminal 4, slight amounts of light components with wavelengths of $\lambda_{-4}$ through $\lambda_{+2}$ are also input to the BiDCG 61 by way of the second input terminal 4 because the optical demultiplexer 43 cannot eliminate those light components perfectly. Both the lightwave signal with a wavelength of $\lambda_{+4}$ and the lightwave signal with a wavelength of $\lambda_{+3}$, which have been applied to the BiDCG 61 by way of the second input terminal 4, reach the chirped grating fiber 6 by way of the second optical circulator 7b and are reflected by the chirped grating fiber 6. They then appear at the second output terminal 5. As a result, at the second output terminal 5, both the lightwave signal with a wavelength of $\lambda_{+4}$ and the lightwave signal with a wavelength of $\lambda_{+3}$, which should be originally furnished via the second output terminal 5, interfere with slight part of light components with wavelengths of $\lambda_{+4}$ and $\lambda_{+3}$ which have been input to the BiDCG 61 by way of the first input terminal 2, and therefore coherent cross talk occurs, thereby reducing their signal quality. Similarly, at the first output terminal 3, slight part of light components with wavelengths of $\lambda_{-4}$ and $\lambda_{-3}$, which have been input to the BiDCG 61 by way of the second input terminal 4, interferes with both the lightwave signal with a wavelength of $\lambda_{-4}$ and the lightwave signal with a wavelength of $\lambda_{-3}$, which have been input to the BiDCG 61 by way of the first input terminal 2, and therefore coherent cross talk occurs.

On the contrary, in the case of the third embodiment, i.e. in the case where the first and second grating fibers 60a and 60b are disposed as shown in FIG. 6, slight part of light components with wavelengths of $\lambda_{+4}$ and $\lambda_{+3}$, which have been input to the BiDCG 61 by way of the first input terminal 2, is mostly reflected by the first grating fiber 60a and is further reflected by the chirped grating fiber 6. Therefore, no light components with wavelengths of $\lambda_{+4}$ and $\lambda_{+3}$ from the first input terminal 2 appear at the second output terminal 5. Similarly, slight part of light components with wavelengths of $\lambda_{-4}$ and $\lambda_{-3}$, which have been input to the BiDCG 61 by way of the second input terminal 4, is mostly reflected by the second grating fiber 60b and is further reflected by the chirped grating fiber 6. Therefore, no light components with wavelengths of $\lambda_{-4}$ and $\lambda_{-3}$ from the second input terminal 4 appear at the first output terminal 3.

Accordingly, the dispersion compensation device according to the third embodiment of the present invention can provide dispersion compensations of the same absolute amount but of opposite sign for both two different input lightwave signals, respectively, using the single chirped grating fiber 6. In addition, the dispersion compensation device can prevent the generation of coherent cross talk even when performing a post dispersion compensation.

In a variant, instead of disposing the first grating fiber 60a between the first optical circulator 7a and the chirped grating fiber 6, the first grating fiber 60a can be disposed between the first input terminal 2 and the first optical circulator 7a. The variant can offer the same advantage as provided the third embodiment mentioned above. Also, instead of disposing the second grating fiber 60b between the second optical circulator 7b and the chirped grating fiber 6, the second grating fiber 60b can be disposed between the second input terminal 4 and the second optical circulator 7b. This variant can also offer the same advantage as provided the third embodiment mentioned above.

Fourth Embodiment

Figure 7:
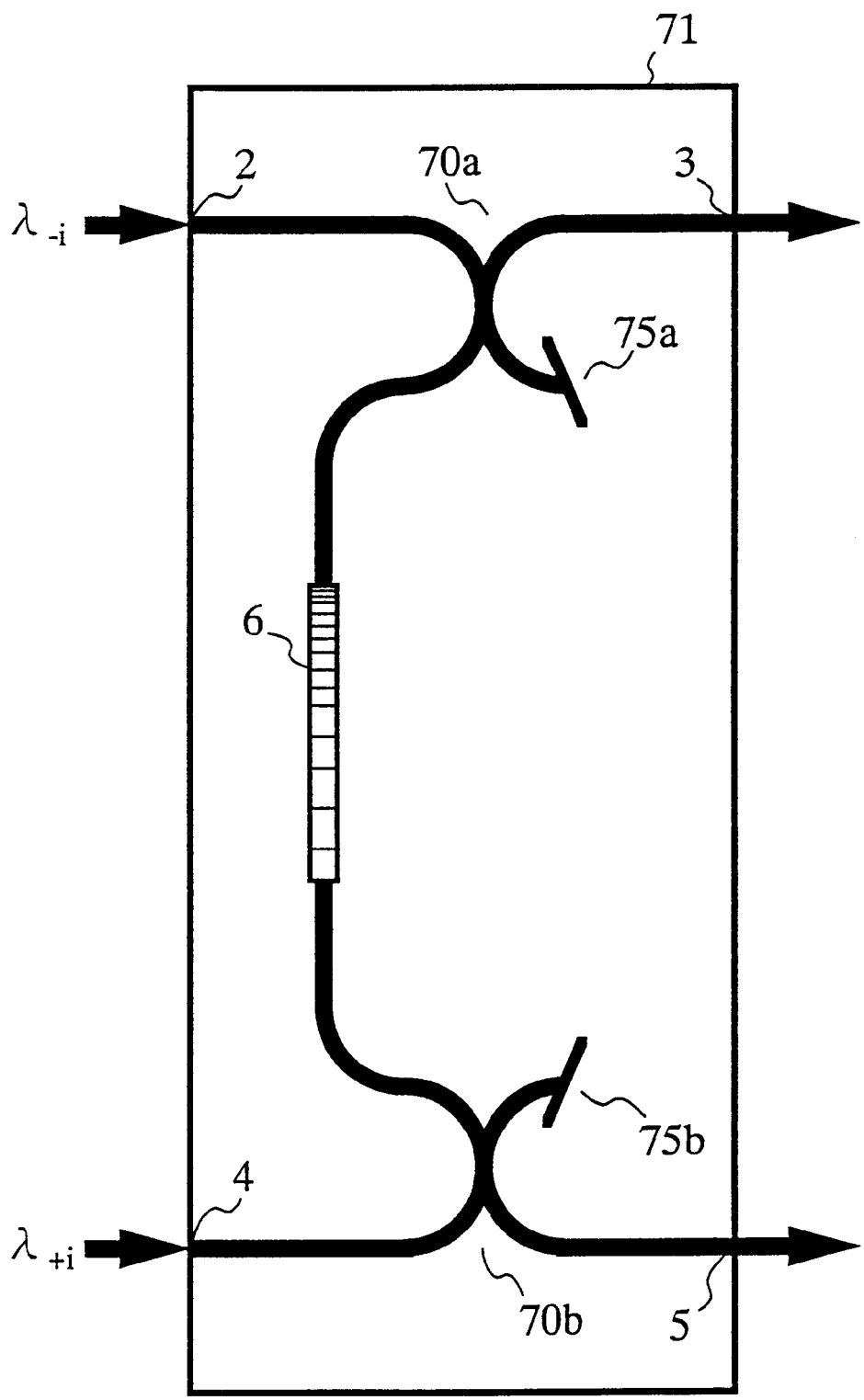
FIG. 7 is a block diagram showing the structure of a dispersion compensation device according to a fourth embodiment of the present invention.

Referring next to FIG. 7, there is illustrated a block diagram showing the structure of a dispersion compensation device or BiDCG according to a fourth embodiment of the present invention. In the figure, the same reference numerals as shown in FIG. 1 designate the same components as those of the dispersion compensation device according to the above-mentioned first embodiment of the present invention. Reference numeral 71 denotes a dispersion compensation device or BiDCG of the fourth embodiment of the present invention, 70a denotes a first 3 dB optical coupler, 70b denotes a second 3 dB optical coupler, 75a denotes a first reflectionless termination connected to the first 3 dB optical coupler 70a, and 75b denotes a second reflectionless termination connected to the second 3 dB optical coupler 70b. The first 3 dB optical coupler 70a has a first pair of terminals and a second pair of terminals. One of the first pair of terminals of the first 3 dB optical coupler 70a serves as a first input terminal 2 of the BiDCG 71, and the other serves as a first output terminal 3 of the BiDCG 71. One of the second pair of terminals of the first 3 dB optical coupler 70a is connected to the chirped grating fiber 6, and the other is connected to the first reflectionless termination 75a. Similarly, the second 3 dB optical coupler 70b has a first pair of terminals and a second pair of terminals. One of the first pair of terminals of the second 3 dB optical coupler 70b serves as a second input terminal 4 of the BiDCG 71, and the other serves as a second output terminal 5 of the BiDCG 71. One of the second pair of terminals of the second 3 dB optical coupler 70b is connected to the chirped grating fiber 6, and the other is connected to the second reflectionless termination 75b.

Next, a description will be made as to the operation of the BiDCG 71 of the fourth embodiment. The first and second 3 dB optical couplers 70a and 70b operate in a manner similar to the first and second optical circulators 7a and 7b of the dispersion compensation device according to the above-mentioned first embodiment of the present invention. The first 3 dB optical coupler 70a divides light with a wavelength of $\lambda_{-i}$ applied to the first input terminal 2 into two equal parts, and one of them is input to the chirped grating fiber 6. The part of the light with a wavelength of $\lambda_{-i}$, which is input to the chirped grating fiber 6, is reflected by the chirped grating fiber 6 and is further divided into two equal parts by the first 3 dB optical coupler 70a. One of them is furnished by way of the first output terminal 3. The other part of the light with a wavelength of $\lambda_{-i}$ applied to the first input terminal 2, which has been divided for the first time, enters the first reflectionless termination 75a and is then absorbed by the first reflectionless termination. Similarly, the second 3 dB optical coupler 70b divides light with a wavelength of $\lambda_{+i}$ applied to the second input terminal 4 into two equal parts, and one of them is input to the chirped grating fiber 6. The part of the light with a wavelength of $\lambda_{-i}$, which is input to the chirped grating fiber 6, is reflected by the chirped grating fiber 6 and is further divided into two equal parts by the second 3 dB optical coupler 70b. One of them is furnished by way of the second output terminal 5.

Accordingly, the dispersion compensation device according to the fourth embodiment of the present invention can provide dispersion compensations of the same absolute amount but of opposite sign for both two different input lightwave signals, respectively, using the single chirped grating fiber 6. In addition, although therecauses, in theory, an insertion loss of 6dB in the amount of light applied to either of the first and second input terminals 2 and 4 because the light makes a round trip in the 3 dB optical coupler, the physical size and manufacturing cost of the dispersion compensation device can be reduced, because it does not use any optical circulator, unlike the dispersion compensation device according to the first embodiment mentioned above.

Fifth Embodiment

Figure 8:
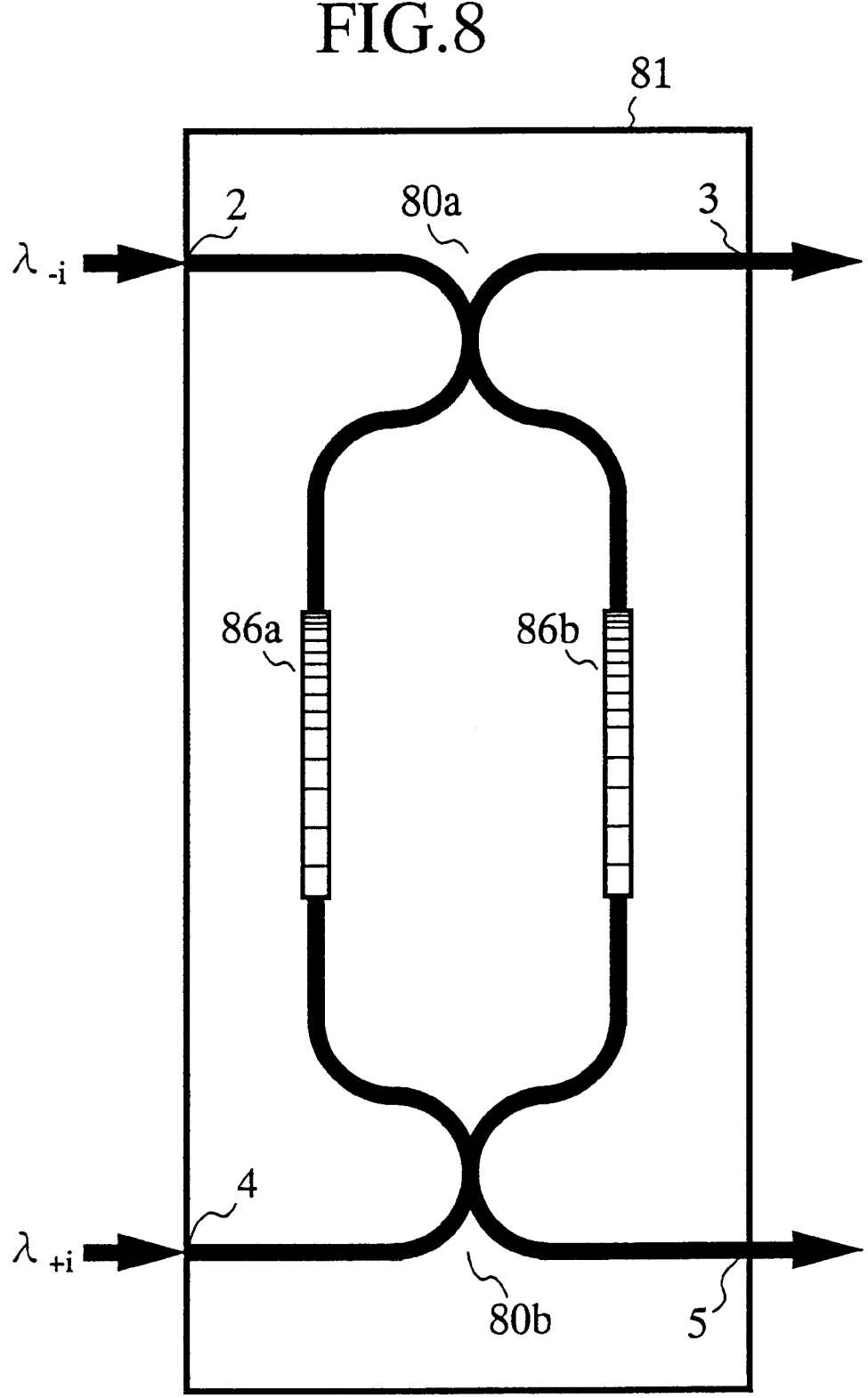
FIG. 8 is a block diagram showing the structure of a dispersion compensation device according to a fifth embodiment of the present invention.

Referring next to FIG. 8, there is illustrated a block diagram showing the structure of a dispersion compensation device or BiDCG according to a fifth embodiment of the present invention. In the figure, reference numeral 81 denotes a dispersion compensation device or BiDCG of the fifth embodiment of the present invention, 80a denotes a first 3 dB optical coupler, 80b denotes a second 3 dB optical coupler, 86a denotes a first chirped grating fiber, and 86b denotes a second chirped grating fiber. The first 3 dB optical coupler 80a has a first pair of terminals and a second pair of terminals. One of the first pair of terminals of the first 3 dB optical coupler 80a serves as a first input terminal 2 of the BiDCG 81, and the other serves as a first output terminal 3 of the BiDCG 81. One of the second pair of terminals of the first 3 dB optical coupler 80a is connected to one end portion of the first chirped grating fiber 86a with a shorter grating pitch or spacing, and the other is connected to one end portion of the second chirped grating fiber 86b with a shorter grating pitch. Similarly, the second 3 dB optical coupler 80b has a first pair of terminals and a second pair of terminals. One of the first pair of terminals of the second 3 dB optical coupler 80b serves as a second input terminal 4 of the BiDCG 81, and the other serves as a second output terminal 5 of the BiDCG 81. One of the second pair of terminals of the second 3 dB optical coupler 80b is connected to another end portion of the first chirped grating fiber 86a with a longer grating pitch, and the other is connected to another end portion of the second chirped grating fiber 86b with a longer grating pitch. The first and second chirped grating fibers 86a and 86b have the same structure as the chirped grating fiber 6 according to any one of the first to fourth embodiments. Thus, the whole optical system of the dispersion compensation device according to the fifth embodiment of the present invention is configured in the form of a Mach-Zehnder interferometer.

Next, a description will be made as to the operation of the BiDCG 81. The first and second 3 dB optical couplers 80a and 80b operate in a manner similar to the first and second optical circulators 7a and 7b, as shown in FIG. 1, of the dispersion compensation device according to the above-mentioned first embodiment of the present invention. The first 3 dB optical coupler 80a divides light with a wavelength of $\lambda_{-i}$ applied to the first input terminal 2 into two equal parts, and one of them is input to the first chirped grating fiber 86a and the other is input to the second chirped grating fiber 86b. Those parts of the light of a wavelength of $\lambda_{-i}$, which have been input to the first and second chirped grating fibers 86a and 86b, are reflected and positive-dispersed by the first and second chirped grating fibers 86a and 86b. After that, they enter the first 3 dB optical coupler 80a again. All of them of a wavelength of $\lambda_{-i}$, which have been reflected by the first and second chirped grating fibers 86a and 86b, are then combined and furnished by way of the first output terminal 3 without being divided into two parts. The reason why the combination of one optical coupler and two grating fibers can reduce the insertion loss to zero in theory is disclosed in detail by for example D. C. Johnson et al., "New design concept for narrowband wavelength-selective Optical tap and combiner", Electron. Lett., Vol. 23, No. 13, pp.

668–669, June, 1987. The description of the reason why the insertion loss is zero will be therefore omitted hereafter.

Similarly, the second 3 dB optical coupler 80b divides light with a wavelength of $\lambda_{+i}$ applied to the second input terminal 4 into two equal parts, and one of them is input to the first chirped grating fiber 86a and the other is input to the second chirped grating fiber 86b. Those parts of the light of a wavelength of $\lambda_{+i}$, which have been input to the first and second chirped grating fibers 86a and 86b, are reflected and negative-dispersed by the first and second chirped grating fibers 86a and 86b. After that, they enter the second 3 dB optical coupler 80b again. All of them of a wavelength of $\lambda_{+i}$, which have been reflected by the first and second chirped grating fibers 86a and 86b, are then combined and furnished by way of the second output terminal 5 without being divided into two parts.

Accordingly, the dispersion compensation device according to the fifth embodiment of the present invention can provide dispersion compensations of the same absolute amount but of opposite sign for both two different input lightwave signals, respectively while reducing the insertion loss to zero in theory, using the two optical couplers 80a and 80b and the two chirped grating fibers 86a and 86b.

Many widely different embodiments of the present invention may be constructed without departing from the spirit and scope of the present invention. It should be understood that the present invention is not limited to the specific embodiments described in the specification, except as defined in the appended claims.

What is claimed is:

1. A dispersion compensation device comprising:
   a chirped grating;
   a first optical unit for guiding at least a lightwave signal with a wavelength of $\lambda_i$ that needs a positive dispersion compensation and is applied thereto to one end portion of said chirped grating whose grating pitch is shorter, and for furnishing light reflected by said chirped grating; and
   a second optical unit for guiding at least a lightwave signal with a wavelength of $\lambda_j$ that needs a negative dispersion compensation and is applied thereto to another end portion of said chirped grating whose grating pitch is longer, and for furnishing light reflected by said chirped grating.

2. The dispersion compensation device according to claim 1, wherein said first optical unit is a first optical circulator having an intermediate terminal connected to the end portion of said chirped grating whose grating pitch is shorter, and wherein said second optical unit is a second optical circulator having an intermediate terminal connected to the other end portion of said chirped grating whose grating pitch is longer.

3. The dispersion compensation device according to claim 1, wherein said first optical unit is a first optical coupler having a terminal connected to the end portion of said chirped grating whose grating pitch is shorter, and wherein said second optical unit is a second optical coupler having a terminal connected to the other end portion of said chirped grating whose grating pitch is longer.

4. The dispersion compensation device according to claim 1, further comprising a first grating fiber connected to an output terminal of said first optical unit through which light reflected by said chirped grating fiber is furnished, for reflecting at least light with a wavelength of $\lambda_j$, and a second grating fiber connected to an output terminal of said second optical unit through which light reflected by said chirped grating fiber is furnished, for reflecting at least light with a wavelength of $\lambda_i$.

5. The dispersion compensation device according to claim 2, further comprising a first grating fiber connected to an output terminal of said first optical circulator through which light reflected by said chirped grating fiber is furnished, for reflecting at least light with a wavelength of $\lambda_j$, and a second grating fiber connected to an output terminal of said second optical circulator through which light reflected by said chirped grating fiber is furnished, for reflecting at least light with a wavelength of $\lambda_i$.

6. The dispersion compensation device according to claim 3, further comprising a first grating fiber connected to an output terminal of said first optical coupler through which light reflected by said chirped grating fiber is furnished, for reflecting at least light with a wavelength of $\lambda_j$, and a second grating fiber connected to an output terminal of said second optical coupler through which light reflected by said chirped grating fiber is furnished, for reflecting at least light with a wavelength of $\lambda_i$.

7. The dispersion compensation device according to claim 1, further comprising a first grating fiber connected between said first optical unit and said chirped grating fiber, for reflecting at least light with a wavelength of $\lambda_j$, and a second grating fiber connected between said second optical unit and said chirped grating fiber, for reflecting at least light with a wavelength of $\lambda_i$.

8. The dispersion compensation device according to claim 2, further comprising a first grating fiber connected between said first optical circulator and said chirped grating fiber, for reflecting at least light with a wavelength of $\lambda_j$, and a second grating fiber connected between said second optical circulator and said chirped grating fiber, for reflecting at least light with a wavelength of $\lambda_i$.

9. The dispersion compensation device according to claim 3, further comprising a first grating fiber connected between said first optical coupler and said chirped grating fiber, for reflecting at least light with a wavelength of $\lambda_j$, and a second grating fiber connected between said second optical coupler and said chirped grating fiber, for reflecting at least light with a wavelength of $\lambda_i$.

10. The dispersion compensation device according to claim 1, further comprising a first grating fiber connected to an input terminal of said first optical unit through which at least the lightwave signal with a wavelength of $\lambda_i$ is input, for reflecting at least light with a wavelength of $\lambda_j$, and a second grating fiber connected to an input terminal of said second optical unit through which at least the lightwave signal with a wavelength of $\lambda_j$ is input, for reflecting at least light of a wavelength of $\lambda_i$.

11. The dispersion compensation device according to claim 2, further comprising a first grating fiber connected to an input terminal of said first optical circulator through which at least the lightwave signal with a wavelength of $\lambda_i$ is input, for reflecting at least light with a wavelength of $\lambda_j$, and a second grating fiber connected to an input terminal of said second optical circulator through which at least the lightwave signal with a wavelength of $\lambda_j$ is input, for reflecting at least light of a wavelength of $\lambda_i$.

12. The dispersion compensation device according to claim 3, further comprising a first grating fiber connected to an input terminal of said first optical coupler through which at least the lightwave signal with a wavelength of $\lambda_i$ is input, for reflecting at least light with a wavelength of $\lambda_j$, and a second grating fiber connected to an input terminal of said second optical coupler through which at least the lightwave signal with a wavelength of $\lambda_j$ is input, for reflecting at least light of a wavelength of $\lambda_i$.

13. The dispersion compensation device according to claim 3, further comprising a second chirped grating fiber having an end portion whose grating pitch is shorter and which is connected to said first optical coupler and another end portion whose grating pitch is longer and which is connected to said second optical coupler, wherein said first optical coupler is connected to both said first and second chirped gratings so that said first optical coupler divides at least the lightwave signal of a wavelength of $\lambda_i$ applied thereto into two parts and guides them to said first and second chirped gratings, respectively, and then combines light reflected by said first chirped grating with light reflected by said second chirped grating and furnishes the combined light, and wherein said second optical coupler is connected to both said first and second chirped gratings so that said second optical coupler divides at least the lightwave signal of a wavelength of $\lambda_j$ applied thereto into two parts and guides them to said first and second chirped gratings, respectively, and then combines light reflected by said first chirped grating with light reflected by said second chirped grating and furnishes the combined light.

14. A multiple-wavelength light transmission system comprising:

a sending terminal station, which performs a pre-dispersion compensation using at least one Bipolar Dispersion Compensation Grating, for transmitting lightwave signals over a transmission fiber; and a receiving terminal station for receiving the lightwave signals transmitted over said transmission fiber.

15. The multiple-wavelength light transmission system according to claim 14, wherein said receiving terminal station performs a post-dispersion compensation using at least one Bipolar Dispersion Compensation Grating.

16. The multiple-wavelength light transmission system according to claim 14, said sending terminal station including:

a plurality of optical sources for sending out lightwave signals with different wavelengths;

said at least one Bipolar Dispersion Compensation Grating; and an optical multiplexer, wherein each of said at least one Bipolar Dispersion Compensation Grating includes two input terminals for receiving two lightwave signals of different wavelengths from said plurality of optical sources and two output terminals for furnishing positive-dispersed lightwave signals and negative-dispersed lightwave signals to said optical multiplexer, and wherein said positive-dispersed and negative-dispersed lightwave signals furnished by said at least one Bipolar Dispersion Compensation Grating is multiplexed by said optical multiplexer and transmitted over said transmission fiber.

17. The multiple-wavelength light transmission system according to claim 16, wherein said optical multiplexer is constructed of an array type waveguide grating.

18. The multiple-wavelength light transmission system according to claim 16, wherein said optical multiplexer is constructed of a star coupler.

19. A multiple-wavelength light transmission system comprising:

a sending terminal station for transmitting lightwave signals over a transmission fiber; and a receiving terminal station, which performs a post-dispersion compensation using at least one Bipolar Dispersion Compensation Grating, for receiving the lightwave signals transmitted over said transmission fiber.

20. The multiple-wavelength light transmission system according to claim 19, wherein said sending terminal station performs a pre-dispersion compensation using at least one Bipolar Dispersion Compensation Grating.

21. The multiple-wavelength light transmission system according to claim 19, said sending terminal station including:

an optical demultiplexer for demultiplexing lightwave signals received from said transmission fiber;

said at least one Bipolar Dispersion Compensation Grating; and a plurality of optical receivers, wherein each of said at least one Bipolar Dispersion Compensation Grating includes two input terminals for receiving two lightwave signals of different wavelengths from said optical demultiplexer and two output terminals for furnishing positive-dispersed lightwave signals and negative-dispersed lightwave signals to said optical receivers.

* * * * *